(12) United States Patent
Luisi et al.

(10) Patent No.: US 10,933,318 B2
(45) Date of Patent: *Mar. 2, 2021

(54) SYSTEMS AND METHODS FOR DETECTING AND DISPLAYING A BOUNDARY ASSOCIATED WITH PLAYER MOVEMENT

(71) Applicant: Sony Interactive Entertainment LLC, San Mateo, CA (US)

(72) Inventors: Seth Luisi, Millbrae, CA (US); Mark Rogers, Morgan Hill, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,899

(22) Filed: Jan. 23, 2020

(65) Prior Publication Data
US 2020/0155931 A1 May 21, 2020

Related U.S. Application Data

(63) Continuation of application No. 15/977,235, filed on May 11, 2018, now Pat. No. 10,543,425.
(Continued)

(51) Int. Cl.
*A63F 13/26* (2014.01)
*G06T 7/73* (2017.01)
(Continued)

(52) U.S. Cl.
CPC ............ *A63F 13/26* (2014.09); *A63F 13/211* (2014.09); *A63F 13/212* (2014.09);
(Continued)

(58) Field of Classification Search
CPC ...... A63F 13/26; A63F 13/211; A63F 13/212; A63F 13/213; A63F 13/25; A63F 13/35;
(Continued)

(56) References Cited

U.S. PATENT DOCUMENTS

2005/0049022 A1* 3/2005 Mullen .................. A63F 13/12 463/1
2013/0084970 A1* 4/2013 Geisner ................ A63F 13/216 463/29

(Continued)

*Primary Examiner* — Allen Chan
(74) *Attorney, Agent, or Firm* — Penilla IP, APC

(57) ABSTRACT

Systems and methods for indicating that a boundary is crossed during execution of a video game are described. One of the methods includes generating, by a camera, a field-of-view, the field-of-view encompassing a plurality of boundaries that define a volume. The method further includes capturing, by the camera, one or more images of a head-mounted display (HMD) within the field-of-view. The method includes identifying, by a processor, a position of the HMD in a real-world environment from the one or more images. The method includes determining, by the processor, whether the HMD at the position has crossed one of the boundaries. The method includes generating one or more video frames including a guard rail upon determining that the HMD has crossed the one of the boundaries and sending the one or more video frames to the HMD for display.

25 Claims, 18 Drawing Sheets

Related U.S. Application Data

(60) Provisional application No. 62/507,054, filed on May 16, 2017.

(51) Int. Cl.
| | | |
|---|---|---|
| *G06T 11/00* | (2006.01) | |
| *A63F 13/213* | (2014.01) | |
| *G06T 11/60* | (2006.01) | |
| *A63F 13/211* | (2014.01) | |
| *A63F 13/5255* | (2014.01) | |
| *A63F 13/35* | (2014.01) | |
| *A63F 13/25* | (2014.01) | |
| *A63F 13/847* | (2014.01) | |
| *A63F 13/212* | (2014.01) | |

(52) U.S. Cl.
CPC ............ *A63F 13/213* (2014.09); *A63F 13/25* (2014.09); *A63F 13/35* (2014.09); *A63F 13/5255* (2014.09); *A63F 13/847* (2014.09); *G06T 7/73* (2017.01); *G06T 11/001* (2013.01); *G06T 11/60* (2013.01); *A63F 2300/8082* (2013.01)

(58) Field of Classification Search
CPC ................ A63F 13/5255; A63F 13/847; A63F 2300/8082; G06T 7/73; G06T 11/001; G06T 11/60
USPC .......................................................... 463/31
See application file for complete search history.

(56) References Cited

U.S. PATENT DOCUMENTS

| | | | |
|---|---|---|---|
| 2014/0145914 A1* | 5/2014 | Latta ...................... | G06F 3/013 345/8 |
| 2014/0240351 A1* | 8/2014 | Scavezze ................ | G06F 3/011 345/633 |
| 2016/0171771 A1* | 6/2016 | Pedrotti ............... | G02B 27/017 345/633 |

* cited by examiner

SYSTEMS AND METHODS FOR DETECTING AND DISPLAYING A BOUNDARY ASSOCIATED WITH PLAYER MOVEMENT

CLAIM OF PRIORITY

The present patent application is a continuation of and claims priority to and the benefit, under 35 U.S.C. § 120, of U.S. patent application Ser. No. 15/977,235, filed on May 11, 2018, and titled "SYSTEMS AND METHODS FOR DETECTING AND DISPLAYING A BOUNDARY ASSOCIATED WITH PLAYER MOVEMENT", which claims priority to and the benefit, under 35 U.S.C. § 119, of provisional patent application No. 62/507,054, filed on May 16, 2017, and titled "SYSTEMS AND METHODS FOR DETECTING AND DISPLAYING A BOUNDARY ASSOCIATED WITH PLAYER MOVEMENT", both of which are incorporated by reference herein in their entirety.

FIELD

The present disclosure relates to systems and methods for detecting and displaying a boundary associated with player movement.

BACKGROUND

The video gaming industry is gaining traction. With the advancement of time, more people are playing video games using gadgets, e.g., controllers, cell phones, head-mounted displays, etc. To play the video games, information should be communicated.

It is within this context that embodiments described in the present disclosure arise.

SUMMARY

In an embodiment, systems and methods for detecting and displaying a boundary associated with player movement are described.

In one embodiment, the systems and methods determine a movement of a head-mounted display (HMD) worn by a user and/or of a tracked object carried or held by the user. Upon determining that the HMD crosses a boundary within a field-of-view of a camera or of another device, a full guard rail is displayed on the HMD to inform the user that the boundary is being crossed. Moreover, in response to determining that the tracked object crosses the boundary, a partial guard rail is displayed on the HMD to inform the user that the boundary is being crossed.

In an embodiment, the systems and methods determine whether the tracked object is being occluded from the field-of-view of the camera. Upon determining that the tracked object is being occluded, an occlusion guard rail is displayed within the HMD to inform the user to turn around so that the tracked object is visible to the camera.

In one embodiment, a guard rail, such as the full guard rail, the partial guard rail, or the occlusion guard rail, is image data that is overlaid within a virtual scene of a video game displayed within the HMD. For example, the guard rail has a set of interconnect lines that form a grid and have a contrasting color compared to the virtual scene.

In one embodiment, a method for indicating that a boundary is crossed during execution of a video game is described. The method includes generating, by a camera, a field-of-view, the field-of-view encompassing a plurality of boundaries that define a volume. The method further includes capturing, by the camera, one or more images of an HMD within the field-of-view. The method includes identifying, by a processor, a position of the HMD in a real-world environment from the one or more images. The method includes determining, by the processor, whether the HMD at the position has crossed one of the boundaries. The method includes generating one or more video frames including a guard rail upon determining that the HMD has crossed the one of the boundaries and sending the one or more video frames to the HMD for display.

Some advantages of the herein described systems and methods include generating and displaying a guard rail within a scene of a video game. The guard rail is generated when an HMD worn by a user or a tracked object carried by the user extends outside a pre-determined boundary within a view of a camera. For example, when a boundary is crossed by the HMD, a full guard rail is generated and when a boundary is crossed by the tracked object, a partial guard rail is generated. A guard rail informs the user that the user will be unable to play the video game from a time the boundary is crossed. Also, the guard rail informs the user that the user is outside a play volume and may not be safe, such as, may collide with an object.

Further advantages of the herein described systems and methods include increasing efficiency of a processor. If there is no indication to the user that the HMD or the tracked object has crossed a boundary, the processor that executes the video game is unable to progress the video game, such as from one game level to another or from a number of points awarded to a user account of the user to another number of points awarded to the user account. Although one or more images are captured by a camera of a position and orientation of the HMD or the tracked object, there is no progress in the video game because a change in the position and orientation is not sufficient to shift levels or to award points during the video game. As such, processing power and time of the processor is wasted. The processor could have been used to perform other tasks or could have been allocated to execute another game. When the user is informed that the HMD or the tracked object has crossed the boundary via a display device of the HMD, the user moves so that the HMD or the tracked object moves back within the boundary. The camera captures the movements of the HMD and/or the tracked object within the boundary to generate signals, which are sent to the processor. The processor receives the signals, and analyzes data within the signals to progress the video game to another level or to a different number of points.

DETAILED DESCRIPTION OF THE EMBODIMENTS

Figure 1:
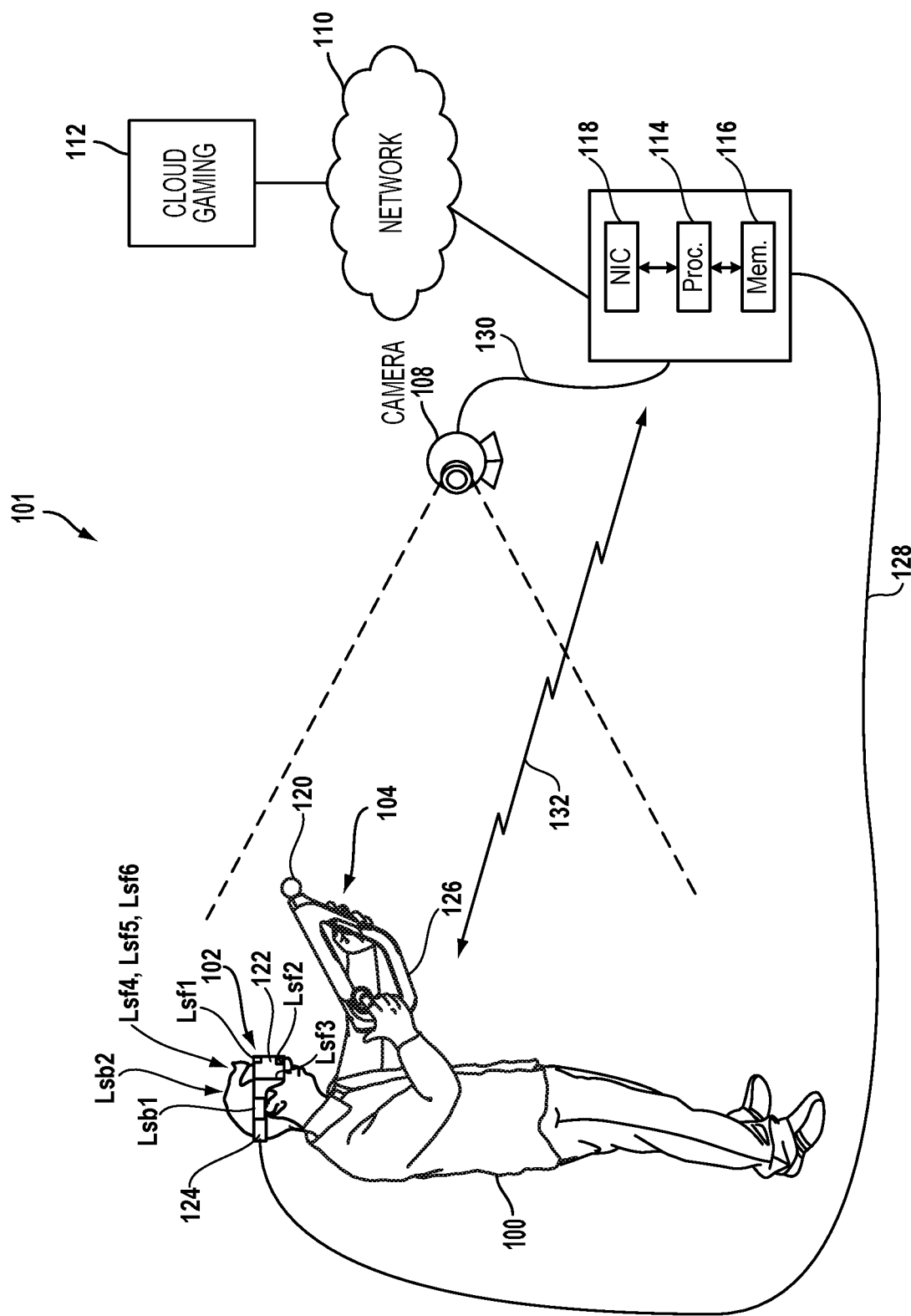
FIG. 1 illustrates a system for interactive game play of a video game, in accordance with an embodiment of the disclosure.

FIG. 1 illustrates a system 101 for interactive game play of a video game, in accordance with an embodiment of the disclosure. A user 100 is shown wearing a head-mounted display (HMD) 102 of the system 101. The HMD 102 includes a display device 122 and a head band 124. Examples of the display device 122 include a liquid crystal display device, a light emitting diode display device, and a plasma display device. The user 100's head fits between the head band 124 and the display device 122. For example, the head band 124 extends from the display device 122 to be able to fit heads of different sizes and shapes of different users. The HMD 102 is worn in a manner similar to glasses, goggles, or a helmet, and is configured to display, on the display device 122, a virtual environment, such as a scene, to the user 100. Examples of the virtual environment include a virtual reality (VR) scene or an augmented reality (AR) scene. The virtual environment is of a video game and includes one or more virtual objects and a background.

The HMD 102 has one or more light sources on its front face, such as a top surface of the display device 122, and has one or more light sources on the head band 124. Examples of a light source include a light emitter, such as a light emitting diode or an incandescent light bulb. The light sources on the top surface of the display device 122 are labeled as lsf1, lsf2, and lsf3. There are three additional light sources, lsf4, lsf5, and lsf6, which are not visible in FIG. 1. A light source on the head band 124 is labeled as lsb1. Another light source lsb2 on the other side of the head band 124 is not visible in FIG. 1.

The HMD 102 provides an immersive experience to the user 100 by virtue of its provision of the display device 122 in close proximity to the user 100's eyes. Thus, the display device 122 provides display regions to each eye of the user 100 and the display regions occupy large portions or even the entirety of a field of view of the user 100.

The HMD 102 is connected to a computer 106 of the system 101 via a connection 128. The connection 128 to computer 106 is wired or wireless. Examples of a wired connection, as used herein, include a parallel transfer connection, a serial transfer connection, and a universal serial bus (USB) connection. Examples of a wireless connection, as used herein, include a Bluetooth™ connection and a Wi-Fi connection. Examples of the computer 106 include a gaming console, a personal computer, a laptop, a tablet, a mobile device, a smart phone, a thin client, a set-top box, a smart television, and a media streaming device.

The computer 106 includes a processor 114, a memory device 116, and a network interface controller (NIC) 118. As used herein, a processor is a central processing unit (CPU), or a controller, or an application specific integrated circuit (ASIC), or a programmable logic device (PLD). Examples of the NIC 118 include a network interface card that is used to connect the computer 106 to the computer network 110. Moreover, examples of the memory device 116 include a read-only memory (ROM), a random access memory (RAM), or a combination that includes RAM and ROM. To illustrate, the memory device 116 is a flash memory device or a redundant array of independent disks (RAID). The processor 114 is coupled to the NIC 118 and the memory device 116.

The user 100 holds in his/her hands a tracked object 104, such as a gun-shaped controller or an Aim™ controller that is manufactured by Sony™ corporation, and operates the tracked object 104 provide input for the video game. For example, the user 100 selects one or more input buttons on the frame of the tracked object 104 using his/her fingers. As another example, the user 100 moves the tracked object 104 of the system 101 in one or more directions to change a position and orientation a virtual object that is represented within the virtual environment displayed on the HMD 102. An example of the tracked object 104 is provided in U.S. patent application Ser. No. 15/283,110, filed on Sep. 30, 2016, and titled "Directional Interface Object", a copy of which is attached below as Appendix A.

The tracked object 104 has a light source 120 that is attached to a frame 126 of the tracked object 104. The frame 126 is made of one or more materials, such as a metal or plastic. The frame 126 is designed to be held by the user 100 and has an ergonomic design. Additionally, the system 101 includes a camera 108. The camera 108 includes one or more image capture devices, such as a stereoscopic pair of cameras, an infrared (IR) camera, a depth camera, or a combination thereof. The camera 108 is coupled to the computer 118 via a connection 130, such as a wired or a wireless connection.

The camera 108 captures images of a real-world environment in which the user 100 is located. Examples of the real-world environment include an enclosed space, a room, a warehouse, and a floor of a building. For example, the camera 108 captures images that include a position and orientation of the light source 120 of the tracked object 104. As another example, the camera 108 captures images that include positions and orientations of one or more of the light sources lsf1 through lsf6 and/or one or more of the light sources lsb1 and lsb2 that are located on the HMD 102.

The captured images of the real-world environment are sent from the camera 108 via the connection 130 to the processor 114 of the computer 106. The processor 114 analyzes the captured images to determine a position and orientation of the user 100, a position and orientation of the HMD 102, and a position and orientation of the tracked object 104. For example, the processor 114 identifies from the captured images the position and orientation of the HMD 102 and the position and orientation of the tracked object 104. From a change in the position and orientation of the HMD 102 in the captured images, the processor 114 determines movement of the HMD 102 in the real-world environment. Moreover, from a change in the position and orientation of the tracked object 104, the processor 114 determines movement of the tracked object 104 in the real-world environment.

The processor 114 executes the video game to determine a state of the video from the position and orientation of the HMD 102 in the real-world environment and/or the position and orientation of the tracked object 104 in the real-world environment. For example, the processor 114 determines that a virtual gun is to move from a lower position to an upper position in the virtual environment when the tracked object 104 moves from a lower position in the real-world environment to an upper position in the real-world environment. As another example, the processor 114 determines that a virtual gun is to move from a right position to a left position in the virtual environment when the tracked object 104 moves from a right position in the real-world environment to a left position in the real-world environment. The processor 114 executes the video game to generate video frames and audio frames. The video and audio frames are sent from the processor 114 via the connection 128 to the HMD 102. The display device 122 of the HMD 102 displays video from the video frames. Moreover, the HMD 102 generates sound that is synchronized with the display of the video. The sound is heard by the user 100 via headphones or speakers that coupled to the HMD 102 via a wired or wireless connection.

Additionally, in an embodiment, the HMD 102 includes one or more microphones to capture sound from the real-world environment. In one embodiment, the microphones are separate from the HMD 102, e.g., integrated within the camera 108, etc. Sound captured by a microphone array is processed to identify a location of a sound source. Sound from an identified location is selectively utilized or processed to the exclusion of other sounds not from the identified location.

In one embodiment, instead of the tracked object 104, another tracked object, such as, a hand-held controller, a video game controller, a DualShock™ controller, a sword-shaped controller, or a Move™ controller, is used. For instance, single-handed controllers are used, as well as two-handed controllers. In some embodiments, the controllers are tracked themselves by tracking lights associated with the controllers, or tracking of shapes, or inertial sensors and inertial data associated with the controllers. Using these various types of controllers, or even simply hand gestures that are made and captured by the camera 108, it is possible to interface, control, maneuver, interact with, and participate in the virtual environment presented on the HMD 102.

In an embodiment, the camera 108 is a part of the computer 106 and a lens of the camera 108 faces the real-world environment.

In one embodiment, the computer 106 functions as a thin client in communication over a computer network 110 with a cloud gaming provider 112. Examples of the computer network 110 include a local area network such as an Intranet, or a wide area network such as the Internet, or a combination thereof. The cloud gaming provider 112 is a server system that includes one or more servers for execution of the video game. In an embodiment, the cloud gaming provider 112 is a virtual machine. The cloud gaming provider 112 maintains and executes the video game being played by the user 100. The NIC 118 of the computer 106 transmits inputs, such as button selections or gestures performed by the user 100 or the position and orientation of the HMD 102 or the position and orientation of the tracked object 104, from the HMD 102, the tracked object 104, and/or the camera 108. The inputs are sent from the NIC 118 via the computer network 110 to the cloud gaming provider 112, which processes the inputs to identify the state of the video game to further generate an output. The output, such as video frames, audio frames, or haptic feedback data, for the video game is sent from the cloud gaming provider 112 via the computer network 110 and the NIC 118 to the processor 114. The processor 114 further processes the output before transmission or directly transmits the output to relevant devices, such as the HMD 102 and the tracked object 104. For example, streams of video and audio frames are provided to the HMD 102 via the connection 128 by the processor 114, whereas a haptic feedback command is provided from the processor 114 via a connection 132, such as a wired connection or a wireless connection, between the computer 106 and the tracked object 104 to the tracked object 104.

In one embodiment, the HMD 102, the tracked object 104, and the camera 108, are networked devices that connect to the computer network 110 to communicate with the cloud gaming provider 112. For example, the computer 106 is a local network device, such as a router, that does not otherwise perform video game processing, but which facilitates passage of network traffic.

In an embodiment, the functions described herein as performed by the processor 114 are performed by the one or more servers of the cloud gaming provider 112.

In one embodiment, the HMD 102 has any number of light sources.

Figure 2:
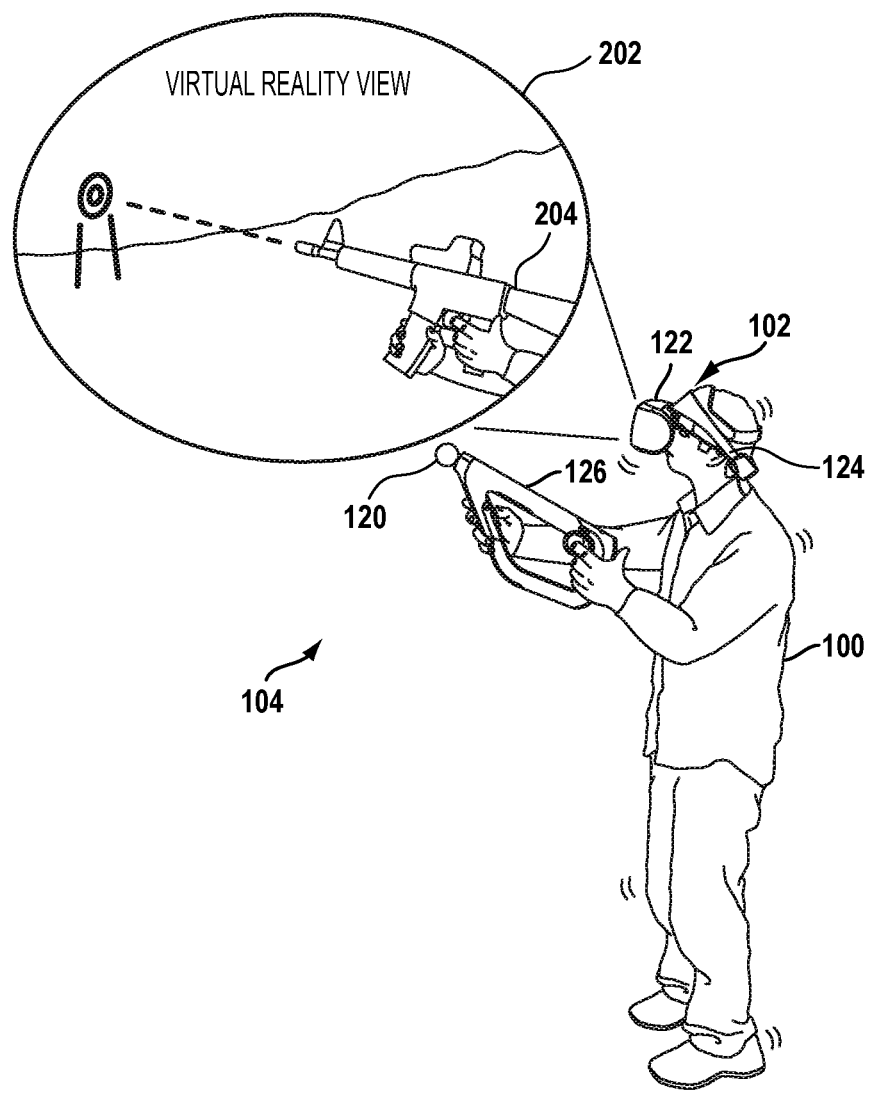
FIG. 2 is a diagram of an embodiment of a system to illustrate a virtual reality view that is displayed within a display device of a head-mounted display (HMD).

FIG. 2 is a diagram of an embodiment of a system 200 to illustrate a virtual reality view 202, which is an example of a virtual environment, that is displayed within the display device 122 of the HMD 102. The user 100 is playing a shooting video game. In the shooting video game, the user 100 selects one or more buttons on the frame 126 of the tracked object 104. Moreover, the user 100 moves the tracked object 104 to change a position, such as a location, of the light source 120. The camera 108 captures one or more images of the position and orientation of the light source 120. The processor 114 receives the one or more images from the camera 108 via the connection 130 and parses the one or more images to determine the position and orientation of the tracked object 104 from the position and orientation of the light source 120. Moreover, the processor 114 receives inertial sensor data, such as pitch, roll, and yaw, of the tracked object 104 from inertial sensors of the tracked object 104 via the connection 132. The processor 114 identifies the orientation of the tracked object 104 from the inertial sensor data received from the inertial sensors of the tracked object 104.

The processor 114 from the position and orientation of the tracked object 104 and from a game code of the video game determines the state of the video game, and generates video frames and audio frames. The video and audio frames are sent from the processor 114 via the connection 128 to the HMD 102, and the video and audio frames are displayed as the virtual reality view 202 by the HMD 102 on the display device 122 of the HMD 102. The virtual reality view 202 includes a virtual gun 204 that has the same position in the virtual reality view 202 with respect to a virtual reference co-ordinate system as a position of the tracked object 104 with respect to a real reference co-ordinate system of the real-world environment, and has the same orientation with respect to the virtual reference co-ordinate system as an orientation of the tracked object 104 with respect to the real reference co-ordinate system. The real reference co-ordinate system has a real reference origin in the real-world environment. The virtual reference co-ordinate system has a virtual reference origin in the virtual reality view 202.

Figure 3:
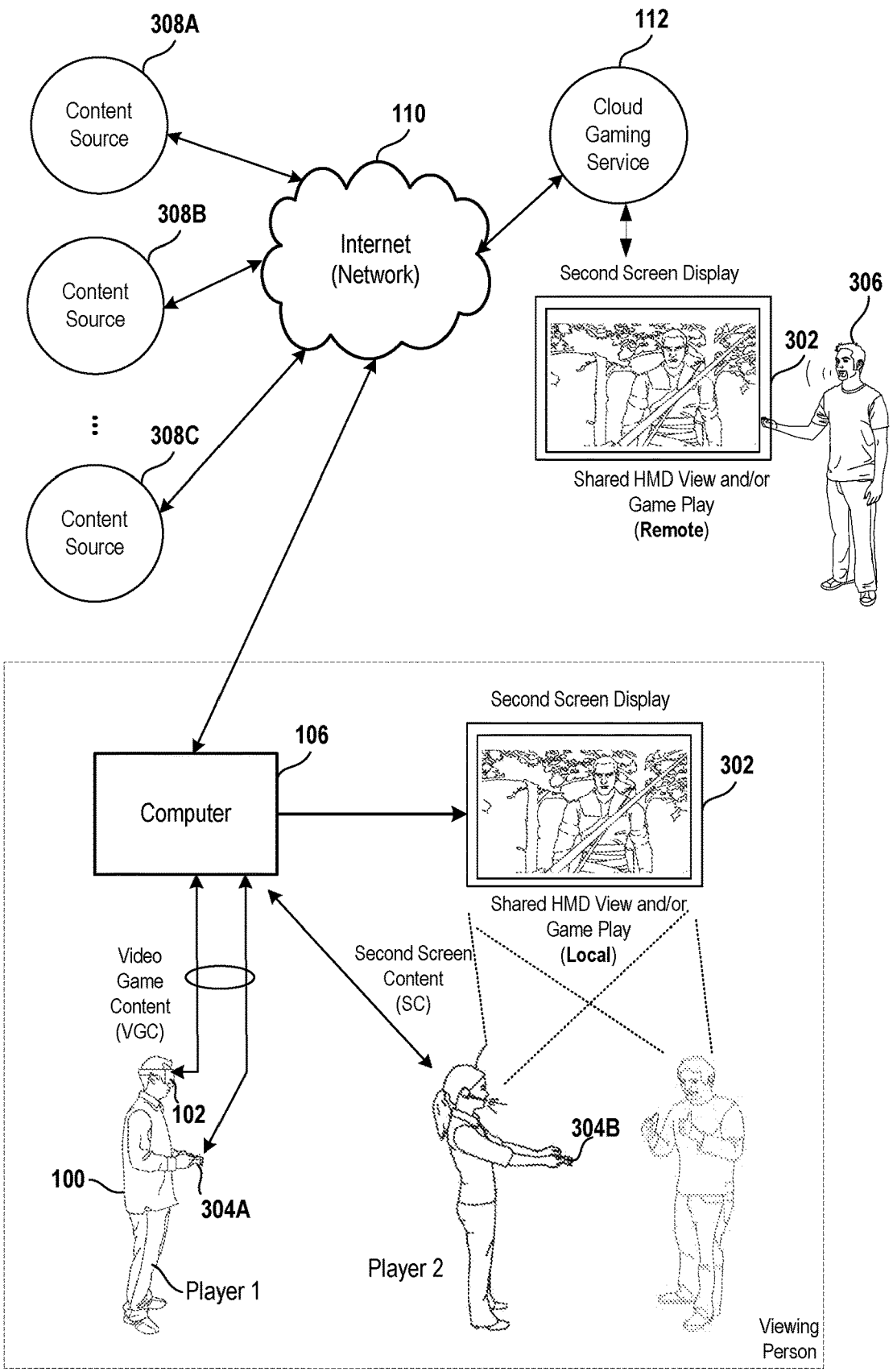
FIG. 3 illustrates an embodiment of the HMD interfacing with a computer, and the computer providing content to a display screen, in accordance with an embodiment of the disclosure.

FIG. 3 illustrates the HMD 102 interfacing with the computer 106, and the computer 106 providing content to a display screen 302. As will be described below, the computer 106 includes integrated electronics for processing the sharing of content from the HMD 102 to the display screen 302. Other embodiments include a separate device, module, connector, that will interface between the computer 106 and each of the HMD 102 and the display screen 302. In this general example, the user 100, sometimes referred to herein as a player 1, is wearing the HMD 102 and is playing the video game using a hand-held controller 304A, such as a DualShock™ controller. The interactive play by the user 100 will produce video game content (VGC), which is displayed interactively to the HMD 102.

The content being displayed on the HMD 102 is shared to the display screen 302. A person viewing the display screen 302 views the content being played interactively in the HMD 102 by the user 100. In an embodiment, another user, such as a player 2, interacts with the computer 106 to produce screen content (SC). The SC is produced when player 2 interacts with a hand-held controller 304B or any type of user interface, or performs a gesture, or provides a voice, or provides an input.

Accordingly, the interactivity by other users who are co-located or remote from an HMD user is social, interactive, and more immersive to both the user 100 and the other users who are viewing the content played by the user 100 on the display screen 302. A user who is remote from the user 100 is labeled as 306. As illustrated, the computer 106 is connected to the computer network 110. The computer network 110 also provides access to the computer 106 to content from various content sources 308A, 308B, and 308C. The content sources 308A, 308B, and 308C include any type of content that is accessible over the computer network 110.

Such content, without limitation, includes video content, movie content, streaming content, social media content, news content, encoded streaming content, friend content, advertisement content, etc. In one embodiment, the computer 106 is used to simultaneously process content for the user 100, such that the HMD 102 is provided with multi-media content associated with interactivity of the user 100 during game play of the video game. The computer 106 also provides other content, which may be unrelated to the content of the video game, to the display screen 302. The computer 106, in one embodiment, receives the screen content for displaying on the display screen 302 from one of the content sources 308A, 308B, and 308C, or from a local user, or a remote user.

Figure 4:
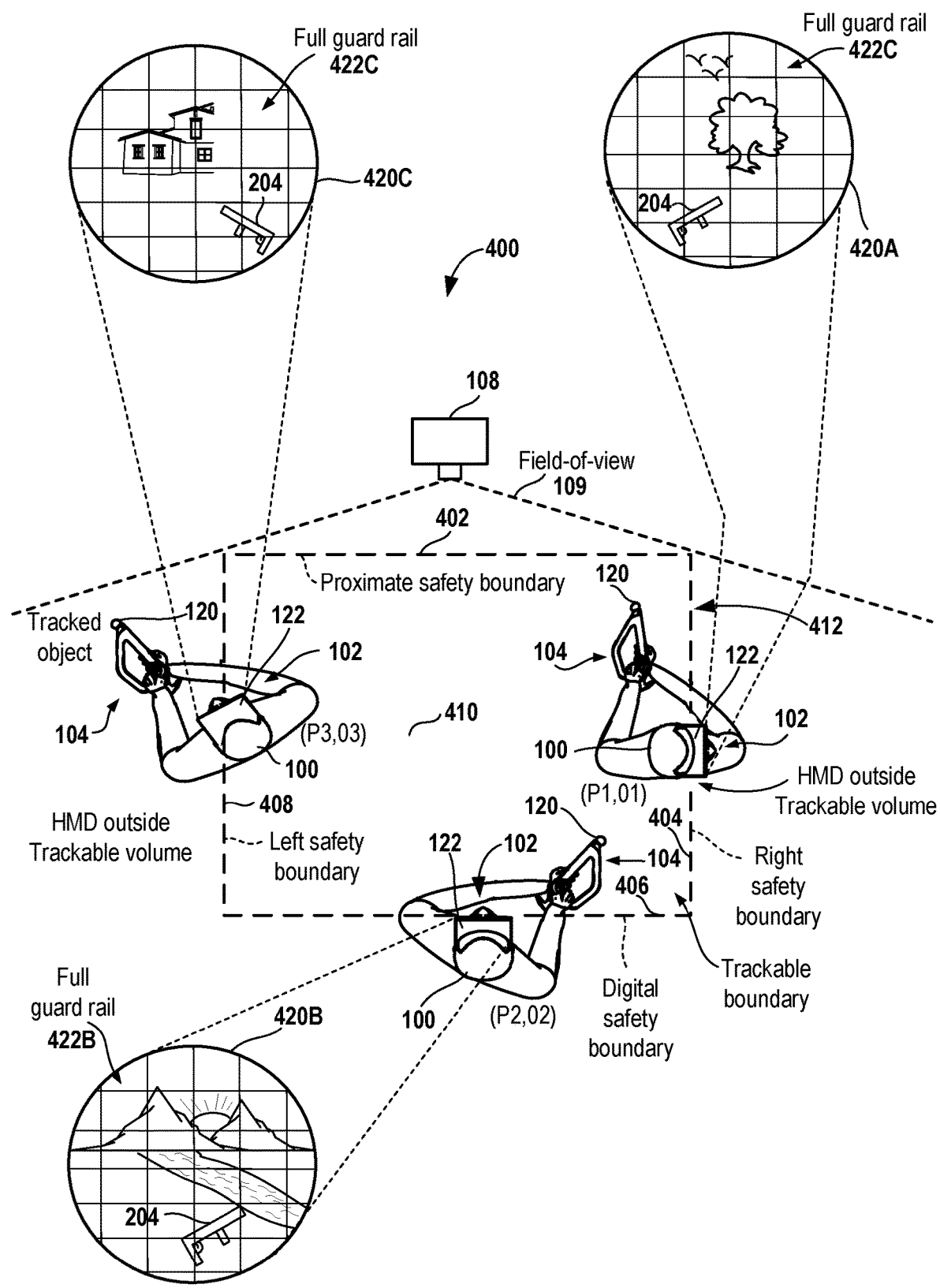
FIG. 4 is a diagram of an embodiment of a system to illustrate a formation of a full guard rail within a virtual reality scene or an augmented reality scene displayed on the HMD.

FIG. 4 is a diagram of an embodiment of a system 400 to illustrate a formation of a full guard rail, such as a grid, within a scene, such as a virtual reality scene or an augmented reality scene, displayed on the HMD 102. The system 400 includes the camera 108, the tracked object 104, and the HMD 102. The camera 108 has a view, such as a field-of-view 109, which includes a proximate safety boundary 402, a right safety boundary 404, a distal safety boundary 406, and a left safety boundary 408. The proximate safety boundary 402 is closer to the camera 108 than the distal safety boundary 406. Moreover, the view of the camera 108 includes a top safety boundary 410 and a bottom safety boundary 412. The top safety boundary 410 is located opposite to the bottom safety boundary 412. Moreover, the left safety boundary 408 is located opposite to the right safety boundary 406.

The boundaries 402 through 412 form a volume or a three-dimensional space in which the user 100 is to play the video game. The volume or the three-dimensional space is sometimes referred to herein as a trackable volume. The right safety boundary 404 forms an angle, such as a right angle or an acute angle or an obtuse angle, with respect to each of the proximate safety boundary 402, the top safety boundary 410, and the bottom safety boundary 412. Similarly, the distal safety boundary 406 forms an angle with respect to each of the right safety boundary 404, the left safety boundary 408, the top safety boundary 410, and the bottom safety boundary 412. Also, the left safety boundary 408 forms an angle with respect to each of the proximate safety boundary 402, the distal safety boundary 406, the top safety boundary 410, and the bottom safety boundary 412. Also, the proximate safety boundary 402 forms an angle with respect to each of the left safety boundary 408, the right safety boundary 404, the top safety boundary 410, and the bottom safety boundary 412.

The camera 108 captures one or more images in which the HMD 102, such as the display device 122 or one or more of the light sources lsf1 through lsf6, cross outside one of the boundaries 402 through 412. For example, at a time the HMD 102 is at a position P1 and an orientation O1, the HMD 102 is outside the right safety boundary 404. As another example, at a time the HMD 102 is at a position P2 and an orientation O2, the HMD 102 is outside the distal safety boundary 406. As yet another example, at a time the HMD 102 is at a position P3 and an orientation O3, the HMD 102 is outside the left safety boundary 408. The processor 114 receives the one or more images from the camera 108 via the connection 130, and parses data of the one or more images to determine whether the HMD 102 is outside one of the boundaries 402 through 412.

Upon determining that the HMD 102 is outside one of the boundaries 402 through 412, the processor 114 determines or identifies from the game code that a full guard rail is to be generated for display on the HMD 102. The processor 114 generates video frames having the full guard rail and sends the video frames via the connection 128 to the HMD 102. The display device 122 of the HMD 120 displays the full guard rail on the HMD 102. For example, when the HMD 102 is at the position P1 and the orientation O1, a scene 420A is displayed by the display device 122. In the scene 420A, a full guard rail 422A is displayed. For example, the full guard rail 422A is displayed between the virtual gun 204 and remaining virtual objects, such as a virtual tree, of the scene 420A. As another example, the full guard rail 422A is overlaid on the remaining virtual objects on the scene 420A. As yet another example, the full guard rail 422A is overlaid on all the virtual objects, such as the virtual gun 204 and the virtual tree, of the scene 420A. As another example, the full guard rail 422A is displayed between one or more virtual objects of the scene 420A and remaining virtual objects of the scene 420A. As another example, the full guard rail 422A is displayed between one or more virtual objects of the scene 420A and a background of the scene 420A. A scene, as referred to herein, is a virtual reality scene or an augmented reality scene.

As another example, when the HMD 102 is at the position P2 and the orientation O2, a scene 420B is displayed by the display device 122. In the scene 420B, a full guard rail 422B is displayed. For example, the full guard rail 422B is displayed between the virtual gun 204 and remaining virtual objects, such as a virtual river, virtual mountains, and virtual sun, of the scene 420B. As another example, the full guard rail 422B is overlaid on the remaining virtual objects on the scene 420B. As yet another example, the full guard rail 422B is overlaid on all the virtual objects, such as the virtual gun 204, the virtual river, the virtual mountains, and the virtual sun, of the scene 420B. As another example, the full guard rail 422B is displayed between one or more virtual objects of the scene 420B and remaining virtual objects of the scene 420B. As another example, the full guard rail 422B is displayed between one or more virtual objects of the scene 420B and a background of the scene 420B.

As yet another example, when the HMD 102 is at the position P3 and the orientation O3, a scene 420C is displayed by the display device 122. In the scene 420C, a full guard rail 422C is displayed. For example, the full guard rail 422C is displayed between the virtual gun 204 and remaining virtual objects, such as a virtual house, of the scene 420C. As another example, the full guard rail 422C is overlaid on the remaining virtual objects on the scene 420C. As yet another example, the full guard rail 422C is overlaid on all the virtual objects, such as the virtual gun 204, the virtual river, the virtual mountains, and the virtual sun, of the scene 420C. As another example, the full guard rail 422C is displayed between one or more virtual objects of the scene 420C and remaining virtual objects of the scene 420C. As another example, the full guard rail 422C is displayed between one or more virtual objects of the scene 420C and a background of the scene 420C.

In one embodiment, the boundaries 402 through 412 are not visible to the user 100 in the real-world environment. For example, when the user 100 is not wearing the HMD 102, the user 100 cannot see the boundaries 402 through 412.

In an embodiment, instead of a grid, any other shaped virtual objects, such as a series of oval virtual objects, or a series of polygonal virtual objects, or a series of round virtual objects, or rows of horizontal lines, or columns of vertical lines, are displayed on the HMD 102 as a full guard rail.

In one embodiment, when any of the boundaries 402 through 412 are crossed by the display device 122, instead of a full guard rail, a partial guard rail is generated and displayed within the display device 122 of the HMD 102.

Figure 5:
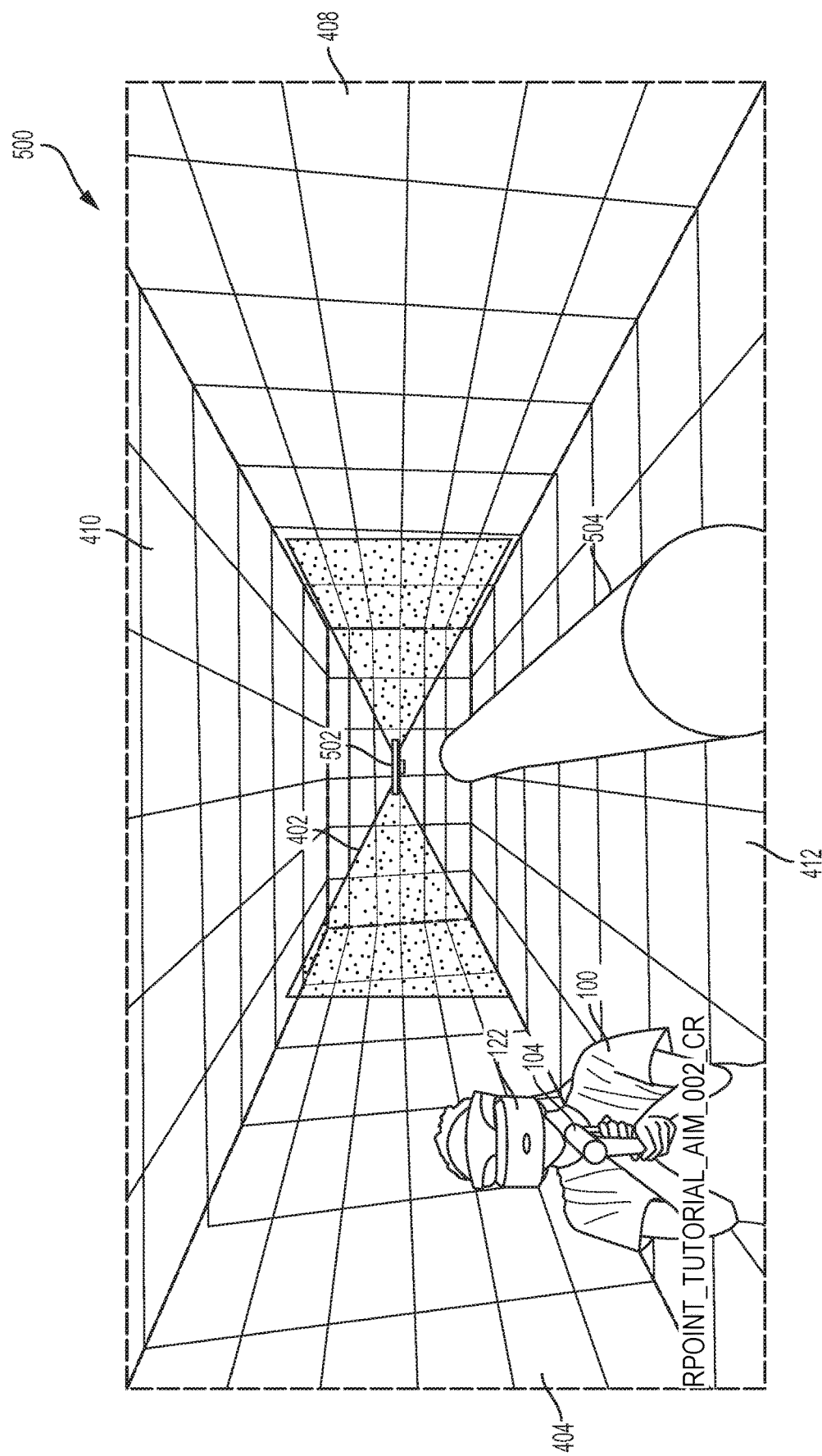
FIG. 5 is a diagram to illustrate an embodiment of an image illustrating multiple boundaries within a display screen.

FIG. 5 is a diagram to illustrate an embodiment of an image 500 illustrating the boundaries 402, 404, 408, 410, and 412 as displayed the display device 302. An image of the user 100 is visible in the image 500 but the user 100 is not within a scene or an augmented reality scene displayed on the HMD 102. The image of the user 100 is visible in FIG. 5 because a scene, such as, the image 500 without the image of the user 100, an image of the tracked object 104, and an image of the HMD 102, depicted on the HMD 102 is also depicted on another screen, such as the display screen 302 (FIG. 3). The image 500 includes an image 502 of the camera 108 and further includes the boundaries 402, 404, 408, 410, and 412. Moreover, the image 500 includes an overlay image 504 of the tracked object 104.

Figure 6:
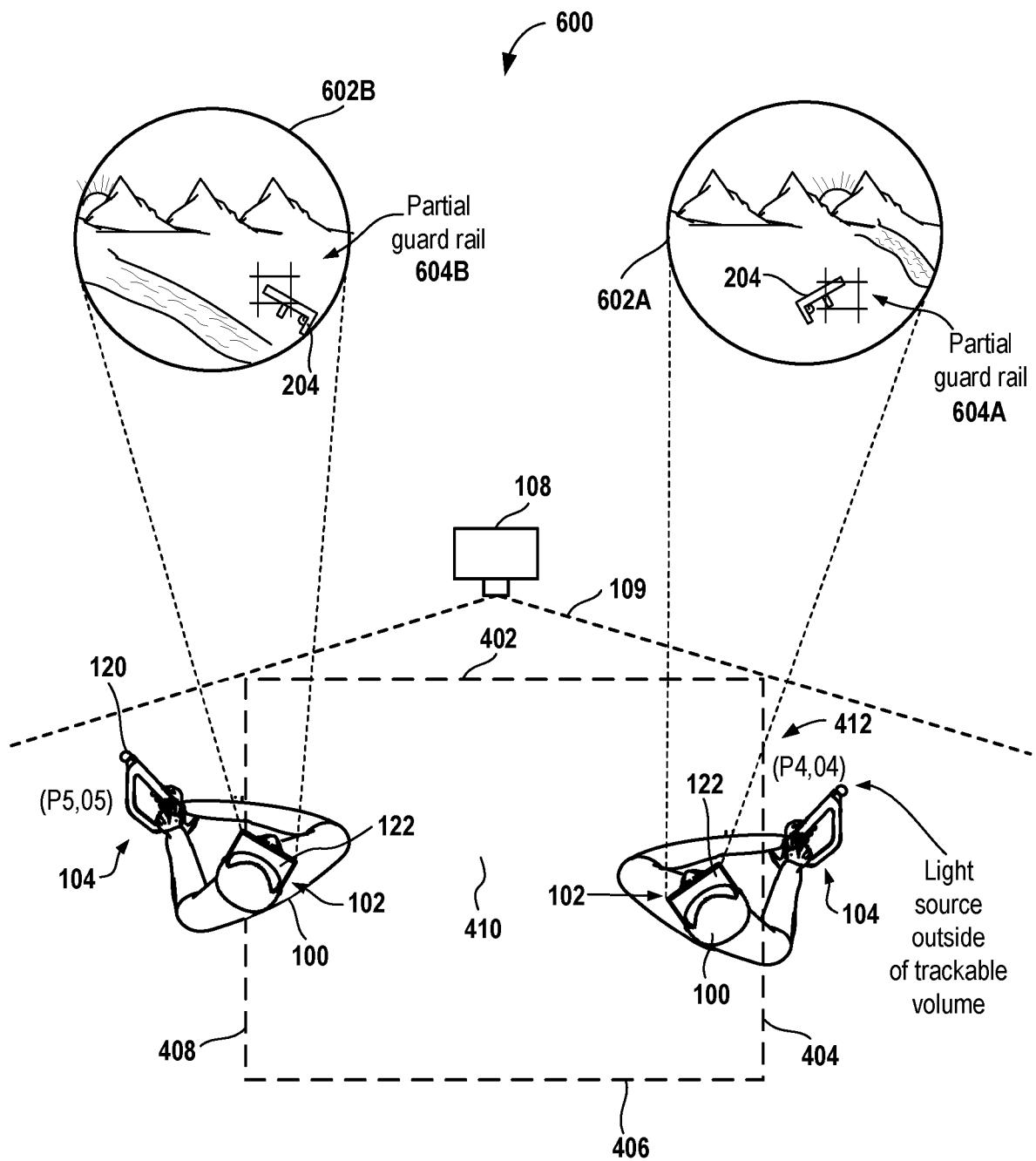
FIG. 6 is a diagram of an embodiment of a system to illustrate a formation of a partial guard rail within a scene displayed on the HMD.

FIG. 6 is a diagram of an embodiment of a system 600 to illustrate a formation of a partial guard rail, such as a grid, within a scene, such as a virtual reality scene or an augmented reality scene, displayed on the HMD 102. The system 600 includes the camera 108, the tracked object 104, and the HMD 102.

The camera 108 captures one or more images in which the tracked object 104, such as the light source 120, crosses outside one of the boundaries 402 through 412. For example, at a time the tracked object 104 is at a position P4 and an orientation O4, the tracked object 104 is outside the right safety boundary 404. As another example, at a time the tracked object 104 is at a position P5 and an orientation O5, the tracked object 104 is outside the left safety boundary 408. The processor 114 receives the one or more images from the camera 108 via the connection 130, and parses data of the one or more images to determine whether the tracked object 104 is outside one of the boundaries 402 through 412 in the real-world environment.

Upon determining that the tracked object 104 is outside one of the boundaries 402 through 412, the processor 114 determines or identifies from the game code that a partial guard rail is to be generated for display on the HMD 102. The processor 114 generates video frames having the partial guard rail and sends the video frames via the connection 128 to the HMD 102. The display device 122 of the HMD 120 displays the partial guard rail on the HMD 102. For example, when the tracked object 104 is at the position P4 and the orientation O4, a scene 602A is displayed by the display device 122. In the scene 602A, a partial guard rail 604A is displayed. For example, the partial guard rail 604A is displayed between the virtual gun 204 and remaining virtual objects, such as a virtual river, multiple virtual mountains, and a virtual sun, of the scene 602A. As another example, the partial guard rail 604A is overlaid on the remaining virtual objects on the scene 602A. As yet another example, the partial guard rail 604A is overlaid on all the virtual objects, such as the virtual gun 204, the virtual river, the virtual mountains, and the virtual sun, of the scene 602A. As another example, the partial guard rail 604A is displayed between one or more virtual objects of the scene 602A and remaining virtual objects of the scene 602A. As another example, the partial guard rail 604A is displayed between one or more virtual objects of the scene 602A and a background of the scene 602A.

As yet another example, when the HMD 102 is at the position P5 and the orientation O5, a scene 602B is displayed by the display device 122. In the scene 602B, a partial guard rail 604B is displayed. For example, the partial guard rail 604B is displayed between the virtual gun 204 and remaining virtual objects, such as the virtual river, the virtual mountains, and the virtual sun, of the scene 602B. As another example, the partial guard rail 604B is overlaid on the remaining virtual objects on the scene 602B. As yet another example, the partial guard rail 604B is overlaid on all the virtual objects, such as the virtual gun 204, the virtual river, the virtual mountains, and the virtual sun, of the scene 602B. As another example, the partial guard rail 604B is displayed between one or more virtual objects of the scene 602B and remaining virtual objects of the scene 602B. As another example, the partial guard rail 604B is displayed between one or more virtual objects of the scene 602B and a background of the scene 602B.

A partial guard rail, as used herein, is smaller than a full guard rail. For example, a partial guard rail extends to a first pre-determined area surrounding a portion of a virtual object, such as the virtual gun 204. The first pre-determined area is smaller than a second pre-determined area covered by a full guard rail. To illustrate, a number of blocks of a partial guard rail is less than a number of blocks of a full guard rail. As another illustration, a number of shapes, such as a series of polygons or a series of ovals, of a partial guard rail is less than a number of shapes of a full guard rail. As another example a partial guard rail does not cover an entire dimension, such as a height or a width or both the height and width, of a scene and a full guard rails covers the entire dimension.

In an embodiment, instead of a grid, any other shaped virtual objects, such as a series of oval virtual objects, or a series of polygonal virtual objects, or a series of round virtual objects, or rows of horizontal lines, or columns of vertical lines, are displayed on the HMD 102 as a partial guard rail.

In one embodiment, when any of the boundaries 402 through 412 are crossed by the tracked object 104, such as by the light source 120, instead of a partial guard rail, a full guard rail is generated and displayed within the display device 122 of the HMD 102.

Figure 7:
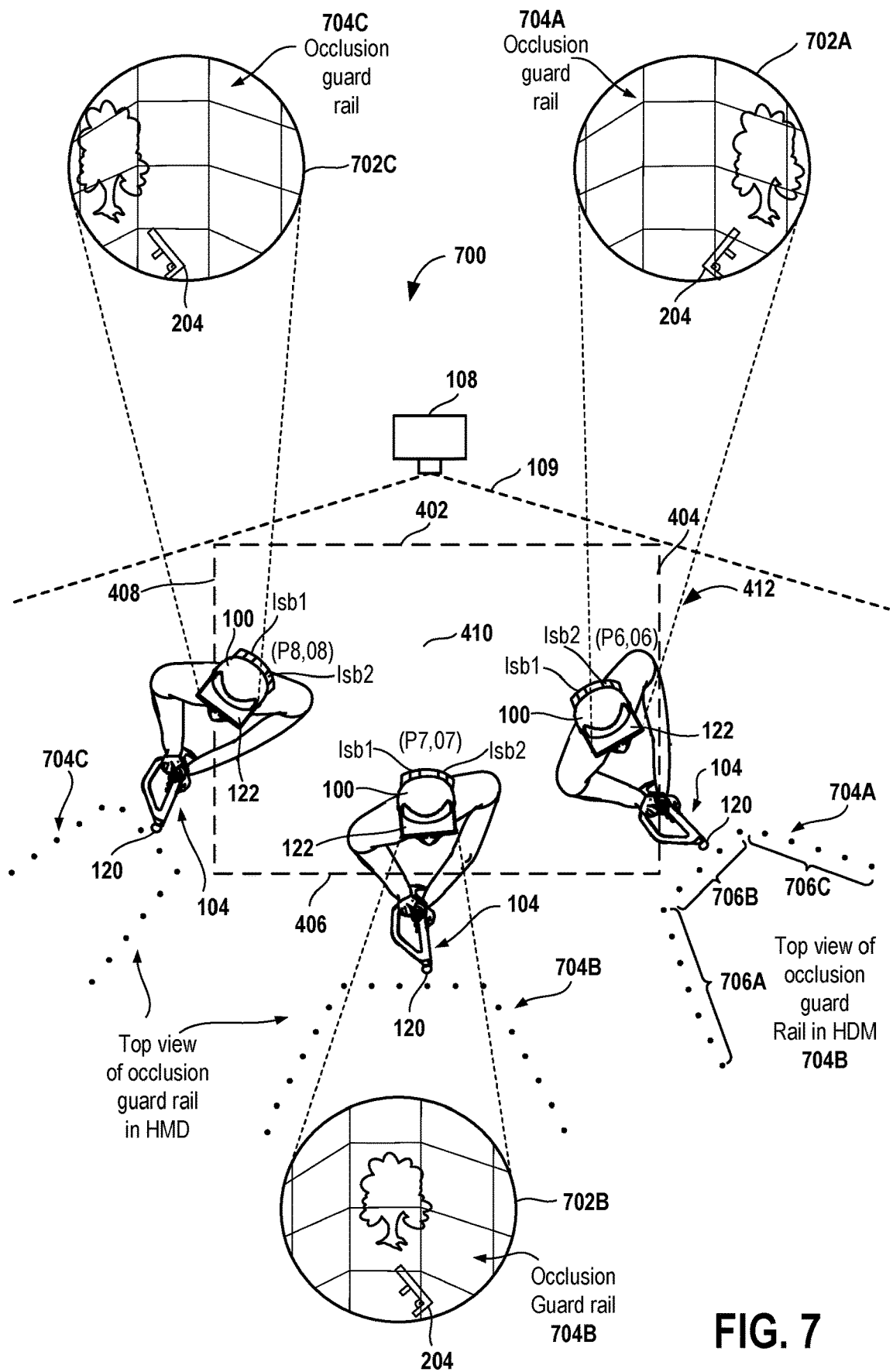
FIG. 7 is a diagram of an embodiment of a system to illustrate generation of an occlusion guard rail for display on the HMD.

FIG. 7 is a diagram of an embodiment of a system 700 to illustrate generation of an occlusion guard rail for display on the display device 122 of the HMD 102. The system 700 includes the camera 108, the tracked object 104, and the HMD 102. The camera 108 captures one or more images in which the light sources lsb1 and lsb2 of the HMD 102 are visible instead of one or more of the light sources lsf1 through lsf6. For example, at a time the HMD 102 is at a position P6 and an orientation O6, the light sources lsb1 and lsb2 are within the view of the camera 108 and one or more of the light sources lsf1 through lsf6 are not within the view of the camera 108. As another example, at a time the HMD 102 is at a position P7 and an orientation O7, the light sources lsb1 and lsb2 are within the view of the camera 108 and one or more of the light sources lsf1 through lsf6 are not within the view of the camera 108. As yet another example, at a time the HMD 102 is at a position P8 and an orientation O8, the light sources lsb1 and lsb2 are within the view of the camera 108 and one or more of the light sources lsf1 through lsf6 are not within the view of the camera 108. Moreover, in the one or more images captured by the camera 108, an image of the light source 120 of the tracked object 104 is absent.

The processor 114 receives the one or more images from the camera 108 via the connection 130, and parses data of the one or more images to determine whether the light sources lsb1 and lsb2 are visible in the one or more images and to determine whether an image of the light source 120 is absent. For example, the processor 114 identifies from the one or more images that the light sources lsb1 and lsb2 have different shapes than the light sources lsf1 through lsf6. The processor 114 parses the data of the one or more images to identify shapes of the light sources lsb1 and lsb2. The processor 114 accesses the memory device 116 to compare the shapes of the light sources lsb1 and lsb2 with a stored shape of any of the light sources lsb1 and lsb2. Upon determining that the shape of each of the light sources lsb1 and lsb2 matches the stored shape, the processor 114 determines that the one or more images include images of the light sources lsb1 and lsb2. As another example, the processor 114 identifies from the one or more images received from the camera 108 that an image having a shape, such as a ball shape or a spherical shape or a round shape, of the light source 120 is not present. The processor 114 accesses the memory device 116 to access a stored shape, such as a ball shape or a spherical shape or a round shape, of the light source 120 and determines whether the stored shape is present in the one or more images received from the camera 108.

Upon determining that images of the light sources lsb1 and lsb2 are present and an image of the light source 120 of the tracked object 104 is absent in the one or more images received from the camera 108, the processor 114 determines or identifies from the game code that an occlusion guard rail is to be generated for display on the HMD 102. The processor 114 generates video frames having the occlusion guard rail and sends the video frames via the connection 128 to the HMD 102. The display device 122 of the HMD 120 displays the occlusion guard rail on the HMD 102. For example, when the HMD 102 is at the position P6 and the orientation O6, a scene 702A is displayed by the display device 122. In the scene 702A, an occlusion guard rail 704A is displayed. For example, the occlusion guard rail 704A is displayed between the virtual gun 204 and remaining virtual objects, such as a virtual palm tree, of the scene 702A. As another example, the occlusion guard rail 704A is overlaid on the remaining virtual objects on the scene 702A. As yet another example, the occlusion guard rail 704A is overlaid on all the virtual objects, such as the virtual gun 204 and the virtual palm tree, of the scene 702A. As another example, the occlusion guard rail 704A is displayed between one or more virtual objects of the scene 702A and remaining virtual objects of the scene 702A. As another example, the occlusion guard rail 704A is displayed between one or more virtual objects of the scene 702A and a background of the scene 702A.

As yet another example, when the HMD 102 is at the position P7 and the orientation O7, a scene 702B is displayed by the display device 122. In the scene 702B, an occlusion guard rail 704B is displayed. For example, the occlusion guard rail 704B is displayed between the virtual gun 204 and remaining virtual objects, such as the virtual palm tree, of the scene 702B. As another example, the occlusion guard rail 704B is overlaid on the remaining virtual objects on the scene 702B. As yet another example, the occlusion guard rail 704B is overlaid on all the virtual objects, such as the virtual gun 204 and the virtual palm tree, of the scene 702B. As another example, the occlusion guard rail 704B is displayed between one or more virtual objects of the scene 702B and remaining virtual objects of the scene 702B. As another example, the occlusion guard rail 704B is displayed between one or more virtual objects of the scene 702B and a background of the scene 702B.

As still another example, when the HMD 102 is at the position P8 and the orientation O8, a scene 702C is displayed by the display device 122. In the scene 702C, an occlusion guard rail 704C is displayed. For example, the occlusion guard rail 704C is displayed between the virtual gun 204 and remaining virtual objects, such as the virtual palm tree, of the scene 702C. As another example, the occlusion guard rail 704C is overlaid on the remaining virtual objects on the scene 702C. As yet another example, the occlusion guard rail 704C is overlaid on all the virtual objects, such as the virtual gun 204 and the virtual palm tree, of the scene 702C. As another example, the occlusion guard rail 704C is displayed between one or more virtual objects of the scene 702C and remaining virtual objects of the scene 702C. As another example, the occlusion guard rail 704C is displayed between one or more virtual objects of the scene 702C and a background of the scene 702C.

In one embodiment, an occlusion guard rail, as used herein, is different than a full guard rail. For example, portions of an occlusion guard rail lie outside a single planar surface of a scene. As another example, an occlusion guard rail has three surfaces, such as a first surface, a second surface, and a third surface. To illustrate, the occlusion guard rail 704A has a first surface 706A, a second surface 706B, and a third surface 706C. A top view of each surface 706A through 706C is visible in FIG. 7. Each of the first, second, and third surface is a grid. The first surface forms an angle, such as an obtuse angle, a right angle, or an acute angle, with respect to the second surface. Similarly, the third surface forms an angle, such as an obtuse angle, a right angle, or an acute angle, with respect to the second surface.

In an embodiment, instead of a grid, any other shaped virtual objects, such as a series of oval virtual objects, or a series of polygonal virtual objects, or a series of round virtual objects, or rows of horizontal lines, or columns of vertical lines, are displayed on the HMD 102 as an occlusion guard rail.

In one embodiment, instead of an occlusion guard rail, a partial guard rail or a full guard rail is displayed when the position P6 and the orientation O6 are achieved, or the position P7 and the orientation O7 are achieved, or the position P8 and the orientation O8 are achieved.

In an embodiment, an occlusion guard rail is generated and displayed on the HMD 102 when the light source 120 is not visible in the one or more images captured by the camera 108 independent of whether the light sources lsb1 and lsb2 are visible in the one or more images.

Figure 8:
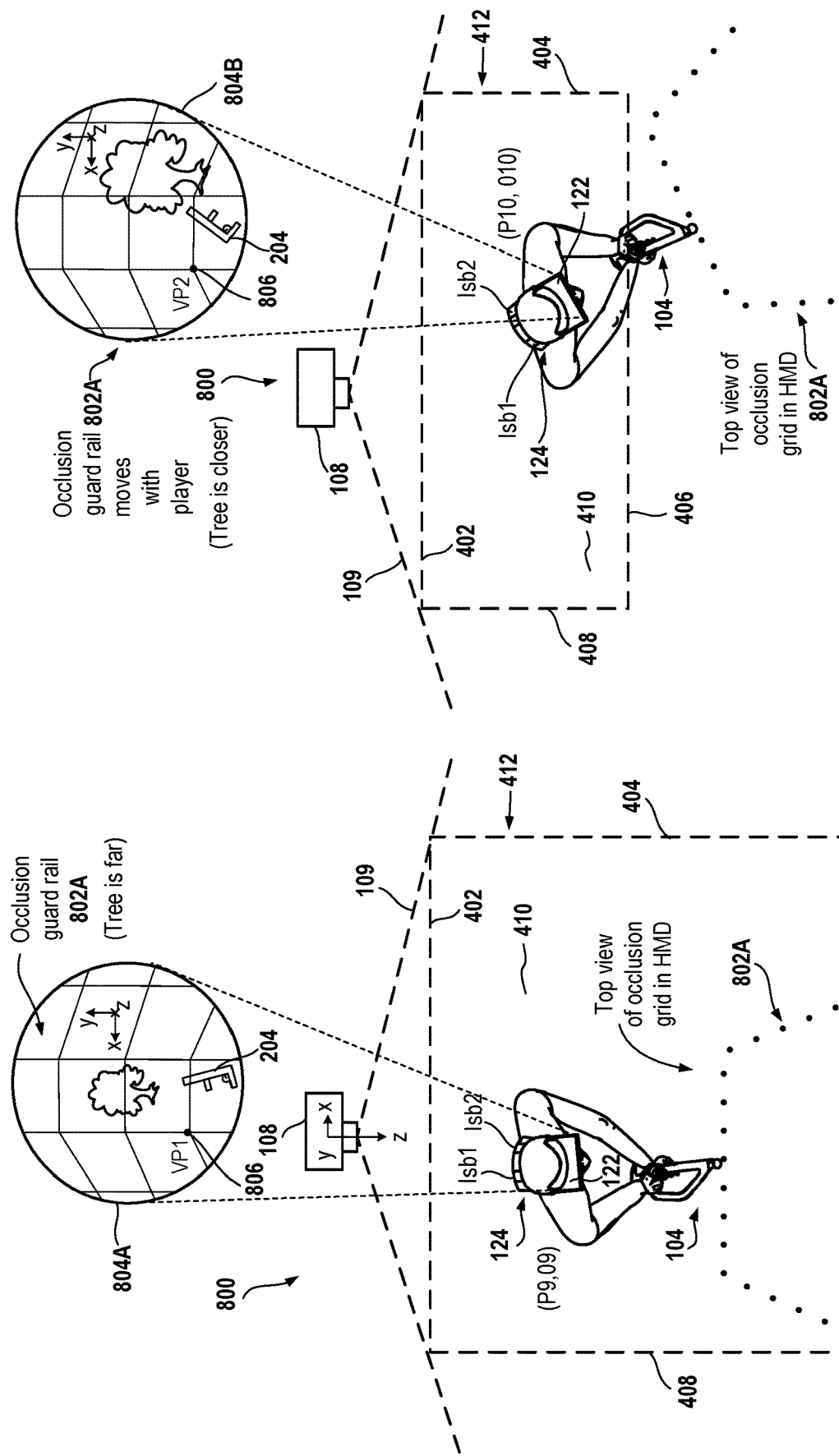
FIG. 8A is a diagram of an embodiment of a system to illustrate movement of an occlusion guard rail with movement of a user wearing the HMD.
FIG. 8B is a diagram of an embodiment of the system of FIG. 8A to illustrate movement of the occlusion guard rail with movement of the user wearing the HMD.

FIG. 8A is a diagram of an embodiment of a system 800 to illustrate movement of an occlusion guard rail with movement of the user 100. The system 800 includes the HMD 102, the tracked object 104, and the camera 108. The HMD 102 is at a position P9 and has an orientation O9 with respect to the camera 108.

When the HMD 102 is at the position P9 and has the orientation O9, the camera 108 captures one or more images of the light sources lsb1 and lsb2, and sends the one or more images via the connection 130 to the processor 114. In addition, the one or more images captured by the camera 108 exclude an image of the light source 120 of the tracked object 104. The processor 114 analyzes the one or more images to determine that the one or more images include images of the light sources lsb1 and lsb2, exclude an image of the light source 120, and that the HMD 102 is at the position P9 and the orientation O9 from the camera 108. The processor 114 determines a state of the video game from the game code based on the position P9, the orientation O9, and the images of the light sources lsb1 and lsb2, and the exclusion of the image of the light source 120. Based on the state of the video game, the processor 114 generates a scene 804A having an occlusion guard rail 802A to be displayed at a virtual position VP1 and a virtual orientation VO1 within the virtual reality scene 804A. The virtual position VP1 and the virtual orientation VO1 are displayed within the scene 804A with reference to the virtual reference origin of the virtual reference co-ordinate system. The virtual reference co-ordinate system is shown as an xyz co-ordinate system in the scene 804A for illustration purposes and is actually not displayed on the HMD 102.

FIG. 8B is a diagram of an embodiment of the system 800 to illustrate movement of an occlusion guard rail with movement of the user 100. The HMD 102 is at a position P10 and has an orientation O10 with respect to the camera 108. For example, the position P10 is further away in a z-direction from the camera 108 compared to the position P9. The z-direction is in the real-world system.

When the HMD 102 is at the position P10 and has the orientation O10, the camera 108 captures one or more images of the light sources lsb1 and lsb2, and sends the one or more images via the connection 130 to the processor 114. In addition, the one or more images captured by the camera 108 excludes an image of the light source 120 of the tracked object 104. The processor 114 analyzes the one or more images to determine that the one or more images include images of the light sources lsb1 and lsb2, exclude the image of the light source 120, and that the HMD 102 is at the position P10 and the orientation O10 from the camera 108. The processor 114 determines a state of the video game from the game code based on the position P10, the orientation O10, and the images of the light sources lsb1 and lsb2, and the exclusion of the image of the light source 120. Based on the state of the video game, the processor 114 generates a scene 804B having the occlusion guard rail 802A to be displayed at a virtual position VP2 and a virtual orientation VO2 within the virtual reality scene 804A. The virtual position VP2 and the virtual orientation VO2 are displayed within the scene 804B with reference to the virtual reference origin of the virtual reference co-ordinate system. The virtual reference co-ordinate system is shown in the scene 804B for illustration purposes and is actually not displayed on the HMD 102. The virtual position VP2 is closer to the virtual reference origin compared to the virtual position VP1. As such, when the occlusion guard rail 802A has the closer virtual position VP2 compared to the virtual position VP1 of the occlusion guard rail 802A, the occlusion guard rail 802A moves with movement of the HMD 102 to be displayed at the virtual position VP2 in the scene 804B. For example, a point 806 on the occlusion guard rail 802A in the scene 802A is further away from the virtual reference origin compared to the point 806 on the occlusion guard rail 802A in the scene 802B. The point 806 is located at the virtual position VP1 in the scene 802A and is located at the virtual position VP2 in the scene 802B.

It should be noted that each position P1 though P10 and each orientation O1 through O10 is with reference to the camera 108. To illustrate, a point on the camera 108 is the real reference origin (0, 0, 0) of the real reference co-ordinate system and the positions P1 through P10 and the orientations O1 through O10 are measured with reference to the real reference origin.

Figure 9:
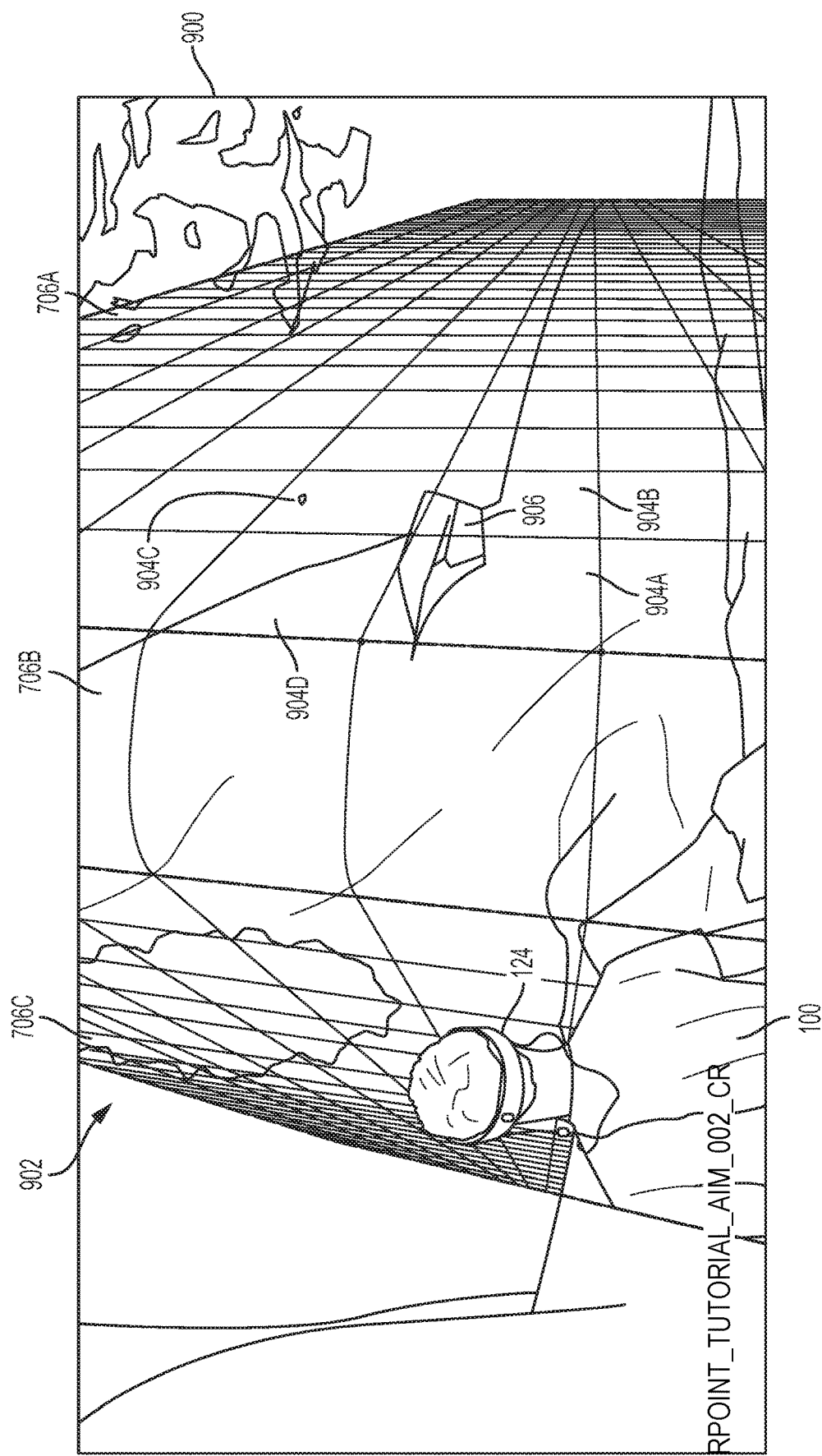
FIG. 9 is a diagram of an embodiment of an image displayed on a display screen to illustrate an occlusion guard rail.

FIG. 9 is a diagram of an image 900 displayed on the display screen 302 (FIG. 3) to illustrate an occlusion guard rail 902, which is an example of any of the occlusion guard rails 704A, 704B, 704C, and 802A. The occlusion guard rail 902 has the first surface 706A, the second surface 706B, and the third surface 706C.

It should be noted that an occlusion guard rail, a partial guard rail, and a full guard rail is a virtual object in a scene. Moreover, in an embodiment, each block of a rail, such as an occlusion guard rail or a full guard rail or a partial guard rail, has a space and a virtual object is visible through the space in a scene. For example, a portion of a virtual object 906, such as a virtual boulder, is visible via a space formed within a block 904A of the occlusion guard rail 902, another portion of the virtual object 906 is visible via a space formed within a block 904B of the occlusion guard rail 902, yet another portion of the virtual object 906 is visible via a space formed within a block 904C of the occlusion guard rail 902, and another portion of the virtual object 906 is visible via a space formed within a block 904D of the occlusion guard rail 902.

Figure 10:
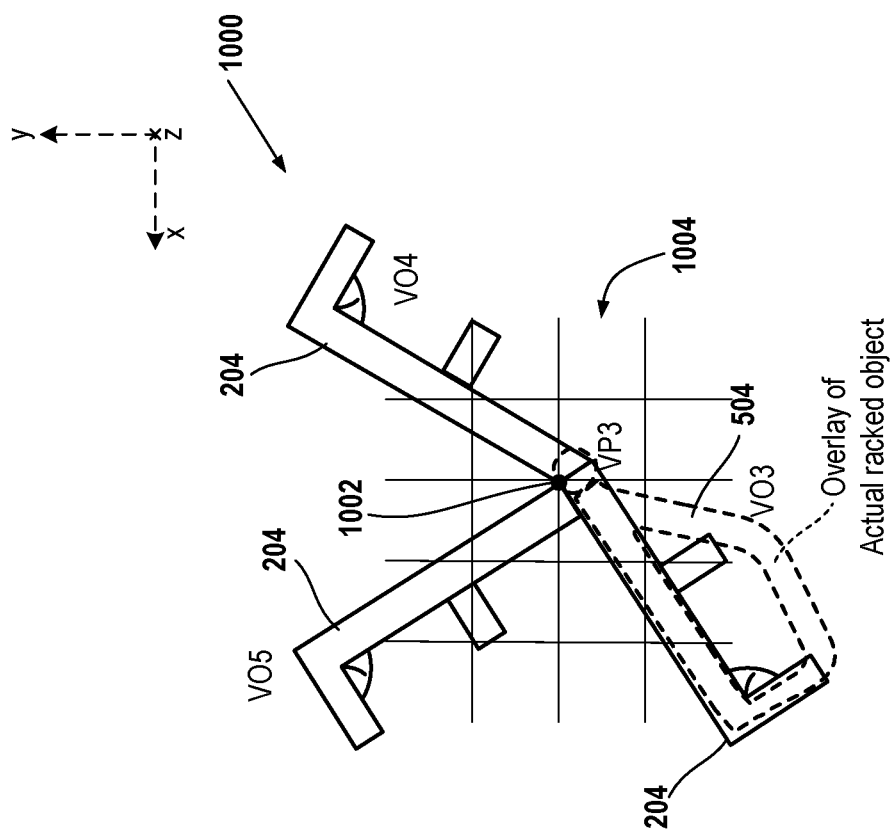
FIG. 10 is a diagram of an image to illustrate a change in an orientation of a virtual gun when a tracked object is outside a boundary that is within a view of a camera.

FIG. 10 is a diagram of an image 1000 to illustrate a change in orientation of the virtual gun 204 when the tracked object 104 is outside one of the boundaries 402 through 412. When the tracked object 104 is outside one of the boundaries 402 through 412, there is no change in a virtual position of one or more points, such as a point 1002, on the virtual gun 204. The point 1002 happens to be located on a guard rail 1004, such as a partial guard rail or a full guard rail or an occlusion guard rail. When the tracked object 104 is outside one of the boundaries 402 through 412, the camera 104 cannot capture an image of the tracked object 104, such as that of the light source 120. When the camera 104 cannot capture the image of the tracked object 104, the processor 114 does not receive data of the image via the connection 130 (FIG. 1) from the camera 108. Without receiving the data of the image, the processor 114 cannot determine a change in a position of the one or more points of the virtual gun 204 and determines that the virtual gun 204, such as the point 1002, is to continue to be at a virtual position VP3. Moreover, the inertial sensor data is sent from the inertial sensors of the tracked object 104 via the connection 132 to the processor 114. The processor 114 determines from the inertial sensor data a change in an orientation of the tracked object 104 with respect to a real co-ordinate system having a real origin on the tracked object 104. The processor 114 determines from the change in the orientation of the tracked object 104, from the virtual position VP3, and the game code of the video game that a virtual orientation of the virtual gun 204 is to be changed without changing the virtual position VP3. In addition, the processor 114 determines from the change in the orientation of the tracked object 104, from the virtual position VP3, and the game code of the video game that the overlay image 504 is to be overlaid on top of the virtual gun 204. The processor 114 generates one or more video frames having the changes in the virtual orientation, such as from a virtual orientation VO3 to a virtual orientation VO4 and further to a virtual orientation VO5, and having the overlay image 504 to be overlaid on the virtual gun 204, and sends the one or more video frames via the connection 128 to the display device 122 for display of the image 1000 on the HMD 102.

In one embodiment, the processor 114 does not determine to overlay the overlay image 504 on top of the virtual gun 204.

Figure 11:
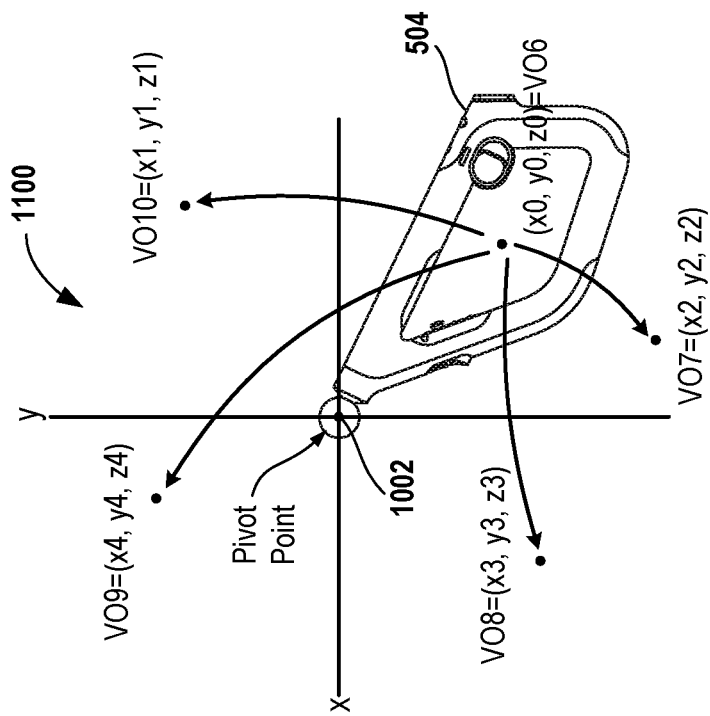
FIG. 11 is a diagram of an embodiment of an image to illustrate a change in an orientation of an overlay image when a tracked object is outside a boundary that is within a view of a camera.

FIG. 11 is a diagram of an embodiment of an image 1100 to illustrate a change in an orientation of the overlay image 504. The processor 114 determines from the change in the orientation of the tracked object 104, from the virtual position VP3, and the game code of the video game that a virtual orientation of the overlay image 504 is to be changed without changing the virtual position VP3. The processor 114 generates one or more video frames having the changes in the virtual orientation of the overlay image 504, such as from a virtual orientation VO6 to a virtual orientation VO7, from the virtual orientation VO7 to a virtual orientation VO8, from the virtual orientation VO8 to a virtual orientation VO9, and from the virtual orientation VO9 to a virtual orientation VO10, and sends the one or more video frames via the connection 128 to the display device 122 for display of the image 1100 on the HMD 102. The virtual orientation VO6 has virtual co-ordinates (x0, y0, z0) with respect to the virtual reference co-ordinate system. Similarly, the virtual orientation VO7 has virtual co-ordinates (x1, y1, z1) with respect to the virtual reference co-ordinate system. Moreover, the virtual orientation VO7 has virtual co-ordinates (x2, y2, z2) with respect to the virtual reference co-ordinate system. Also, the virtual orientation VO8 has virtual co-ordinates (x3, y3, z3) with respect to the virtual reference co-ordinate system. The virtual orientation VO10 has virtual co-ordinates (x4, y4, z4) with respect to the virtual reference co-ordinate system.

Figure 12:
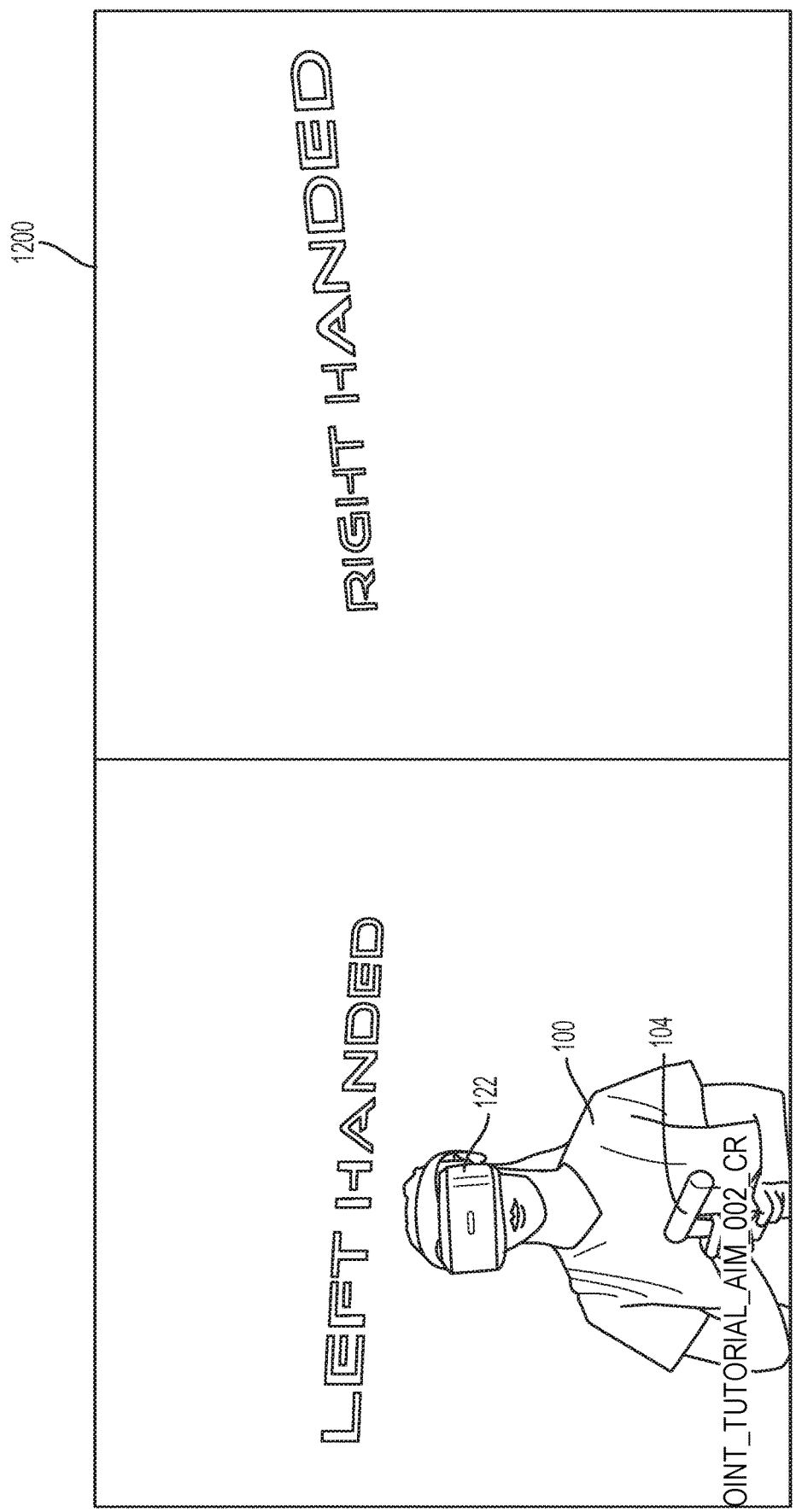
FIG. 12 is a diagram of an image displayed on a display screen to illustrate a calibration performed by using the HMD and the tracked object.

FIG. 12 is a diagram of an image 1200 displayed on the display screen 302 to illustrate calibration performed by using the HMD 102 and the tracked object 104. Before execution of the game code of the video game, the processor 114 sends a portion of the image 1200 via the connection 128 to the HMD 102 for display on the display device 122. The portion of the image 1200 excludes an image of the user 100, an image of the HMD 102, and an image of the tracked object 104. The user 100 uses the tracked object 104 to point at one side of the image 1200 to indicate that the user 100 is left-handed and to point at an opposite side of the image 1200 to indicate that the user 100 is right-handed. The indication of being left-handed or right-handed made by the user 100 is received via the connection 132 from the tracked object 104 by the processor 114 for storage in the memory device 112 and for application during execution of the video game.

Figure 13:
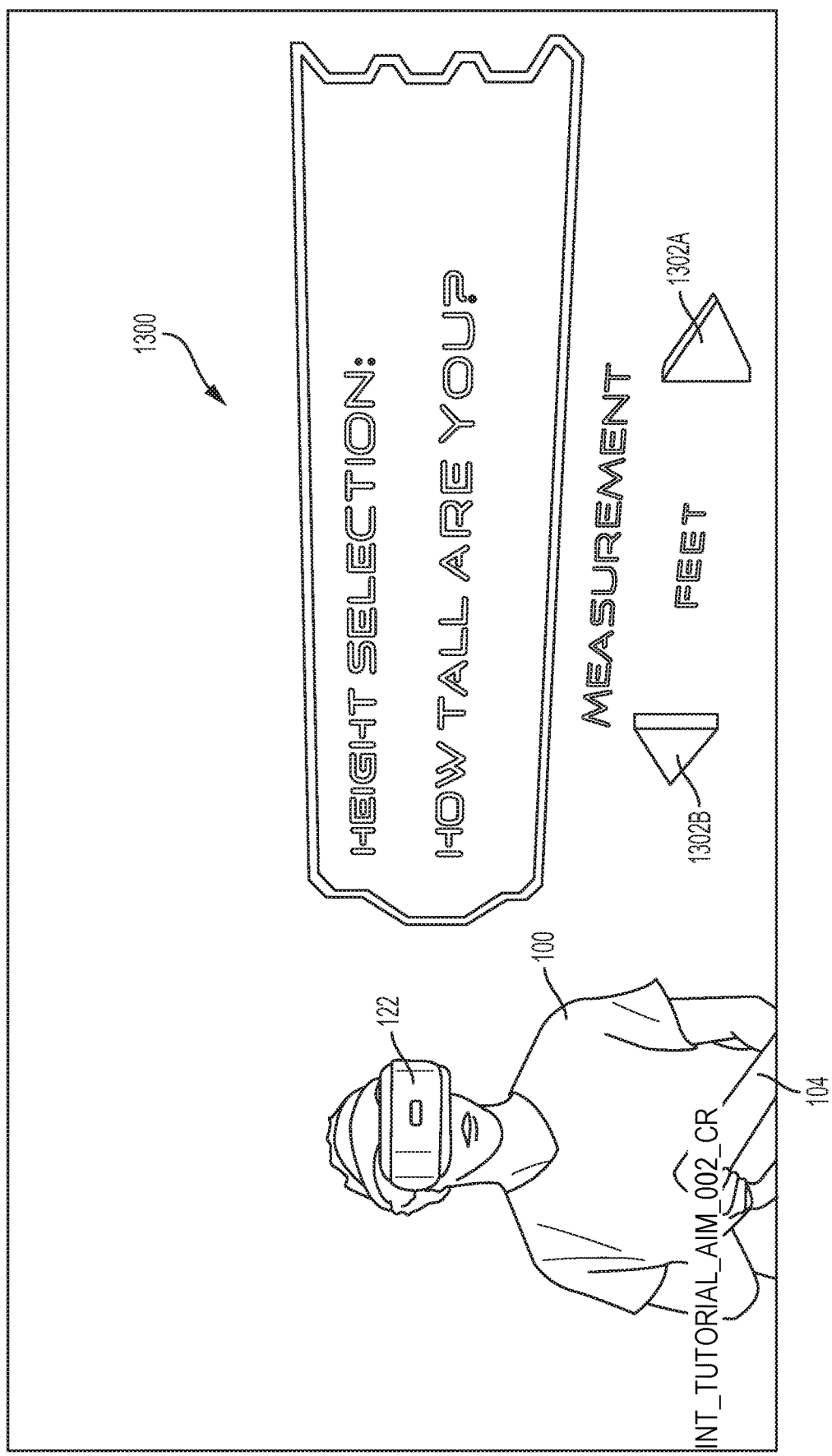
FIG. 13 is a diagram of an image displayed on a display screen to illustrate a calibration performed by using the HMD and the tracked object.

FIG. 13 is a diagram of an image 1300 displayed on the display screen 302 to illustrate calibration performed by using the HMD 102 and the tracked object 104. Before execution of the game code of the video game, the processor 114 sends a portion of the image 1300 via the connection 128 to the HMD 102 for display on the display device 122. The portion of the image 1300 excludes an image of the user 100, an image of the HMD 102, and an image of the tracked object 104. The user 100 uses the tracked object 104 to point to a right option 1302A of the image 1200 or to a left option 1302B to indicate a height of the user 100. The indication of the height made by the user 100 is received via the connection 132 from the tracked object 104 by the processor 114 for storage in the memory device 112 and for application during execution of the video game.

Figure 14:
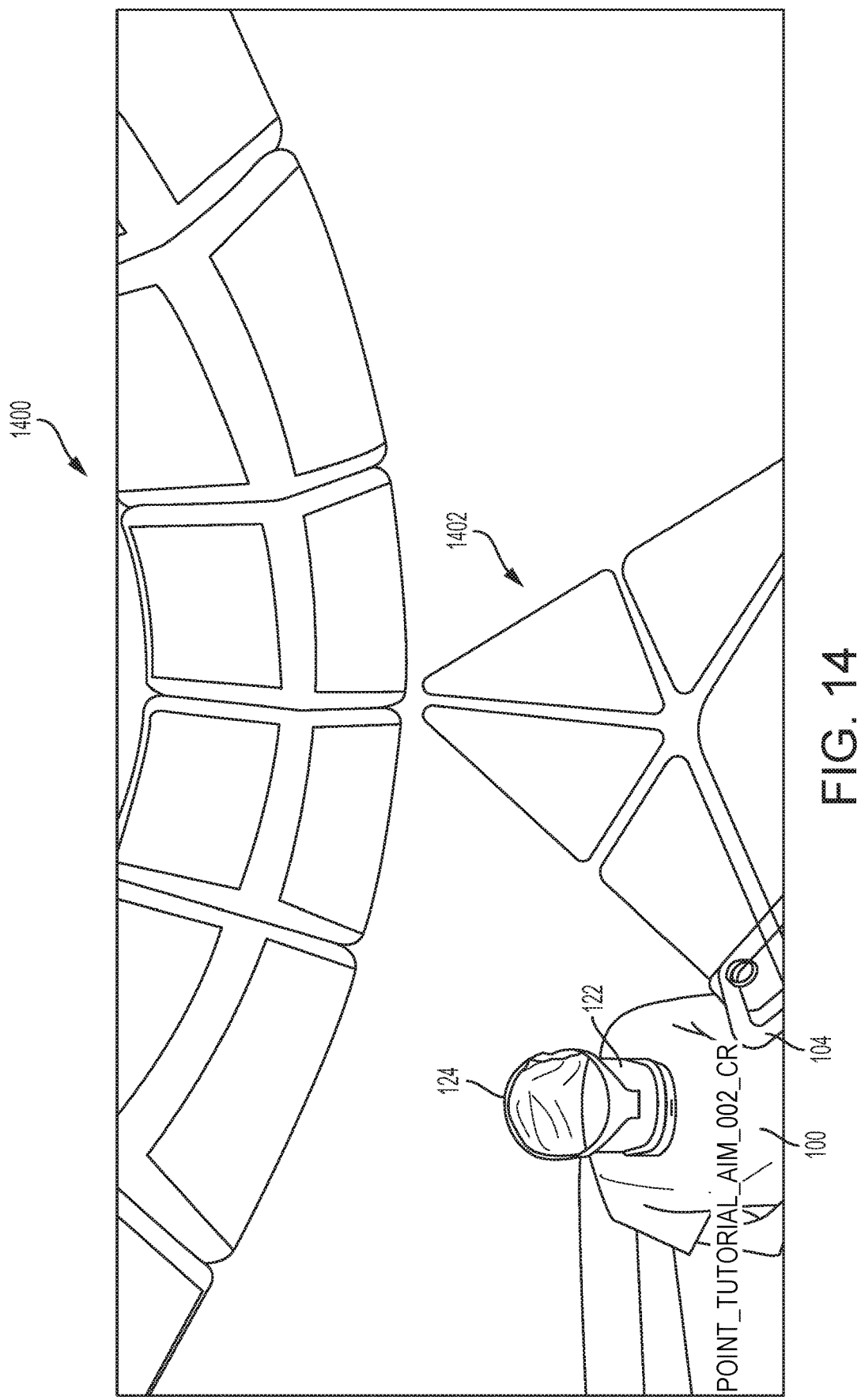
FIG. 14 is a diagram of an image displayed on a display screen to illustrate a verification performed by using the HMD and the tracked object.

FIG. 14 is a diagram of an image 1400 displayed on the display screen 302 to illustrate verification performed by using the HMD 102 and the tracked object 104. Before execution of the game code of the video game, the processor 114 sends a portion of the image 1400 via the connection 128 to the HMD 102 for display on the display device 122. The portion of the image 1400 excludes an image of the user 100, an image of the HMD 102, and an image of the tracked object 104. When the HMD 102 is used to look down, the camera 108 captures one or more images indicating a distance of the HMD 102 from the camera 108 and indicating that the display device 122 of the HMD 102 is facing a floor of the real-world environment. The camera 108 sends the one or more images via the connection 130 to the processor 114. The processor 114 determines from the one or more images received from the camera 108 that the HMD 102 is facing the floor and the distance of the user 100 from the camera 108. The processor 114 determines from the HMD 102 being orientated towards the floor, the distance of the HMD 102 from the camera 108, and a verification code of the video game stored in the memory device 116, that data for a location identifier image 1402 is to be generated. The processor 114 generates the data for the location identifier image 1402 and sends the data via the connection 128 to the HMD 102 for display on the display device 122. When the user 100 views the location identifier image 1402 on the display device 122, the user 100 decides that the user 100 is standing at a distance recommended by the verification code from the camera 108.

Figure 15:
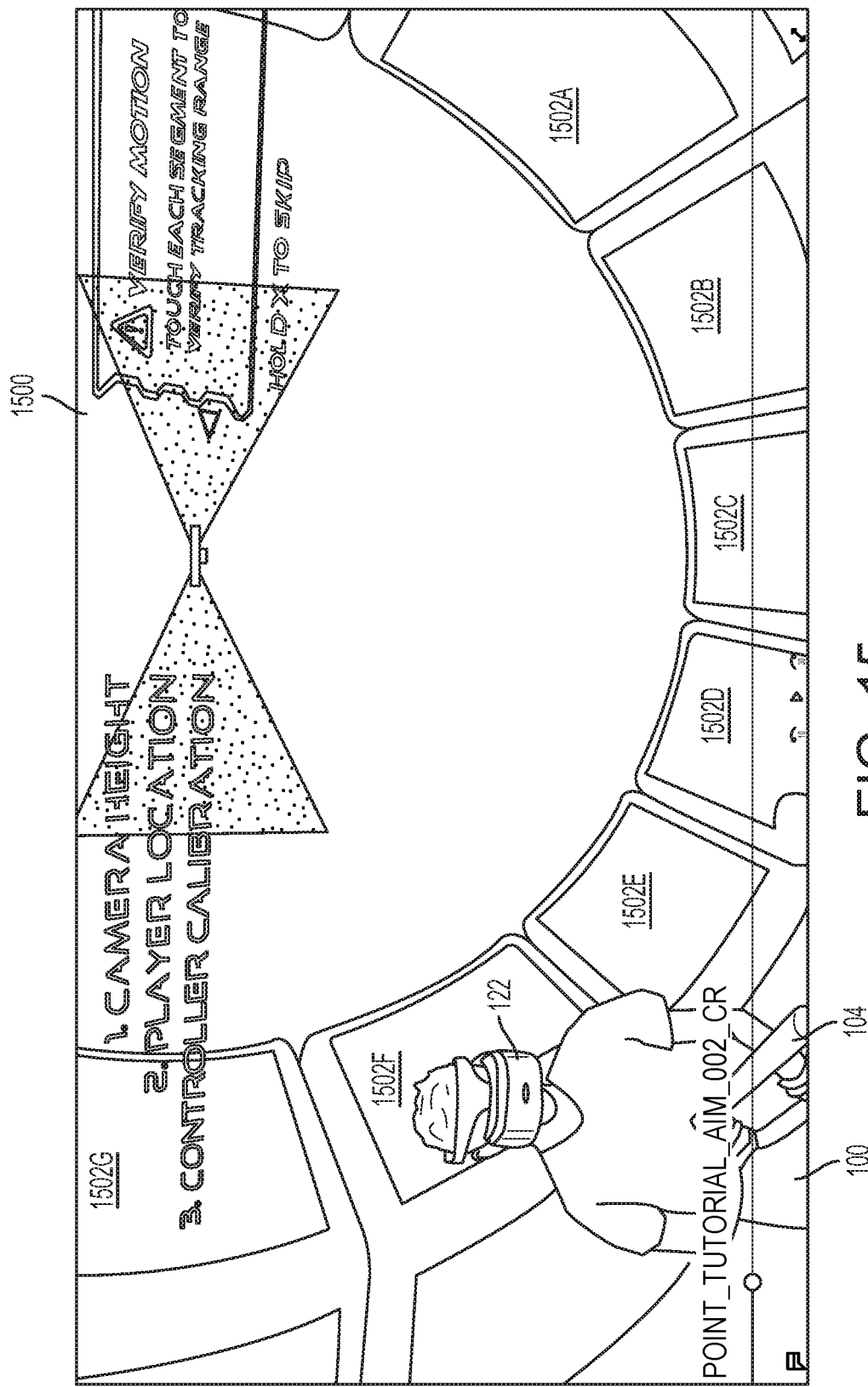
FIG. 15 is a diagram of an image displayed on a display screen to illustrate a calibration of the tracked object performed by using the HMD.

FIG. 15 is a diagram of an image 1500 displayed on the display screen 302 to illustrate calibration of the tracked object 104 by using the HMD 102. Before execution of the game code of the video game, the processor 114 sends a portion of the image 1500 via the connection 128 to the HMD 102 for display on the display device 122. The portion of the image 1500 excludes an image of the user 100, an image of the HMD 102, and an image of the tracked object 104. The user 100 uses the tracked object 104 to point to multiple blocks 1502A, 1502B, 1502C, 1502D, 1502E, 1502F, 1502G, and remaining blocks. The remaining blocks that are used to finish a loop motion of the tracked object 104 are not visible in the image 1500. The camera 108 captures one or more images having a motion of the tracked object 104. The one or more images are sent from the camera 108 via the connection 130 to the processor 114. When the processor 114 determines from the one or more images that the user 100 points to the blocks 1502 through 1502G and the remaining blocks, the processor 114 generates one or more video frames indicating that the blocks 1502 through 1502G and the remaining blocks are lighted. The one or more video frames are sent from the processor 114 via the connection 128 to the HMD 102 for display on the display device 122.

Figure 16:
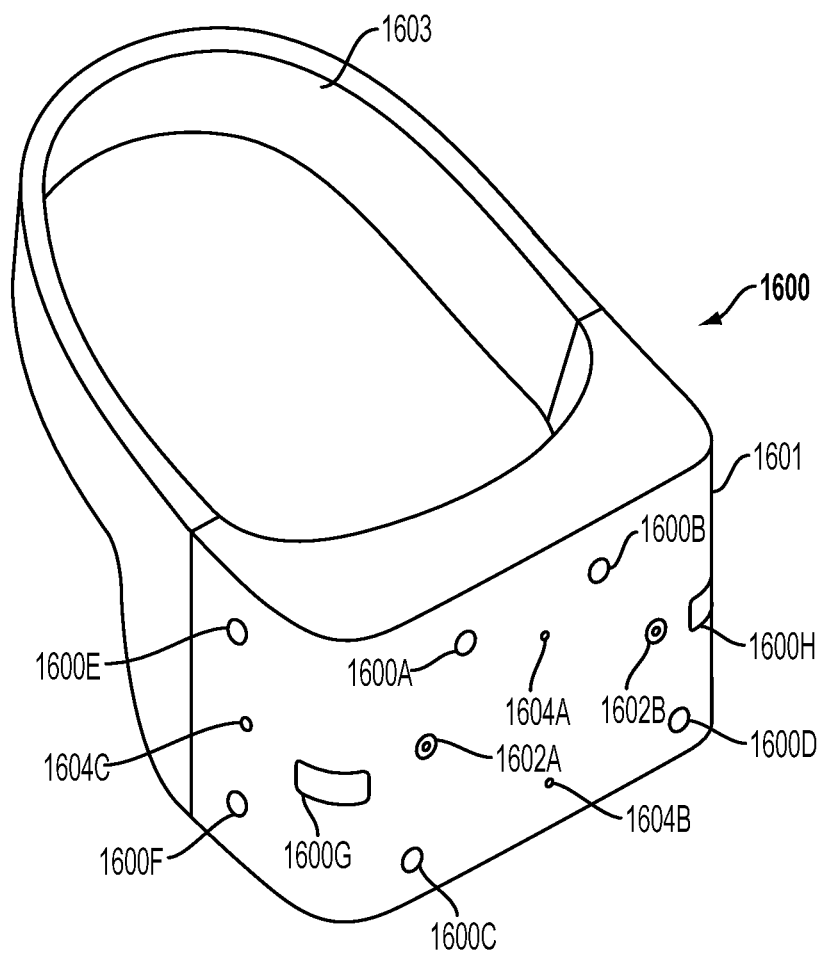
FIG. 16 illustrates an HMD, in accordance with an embodiment of the disclosure.

FIG. 16 illustrates a head-mounted display (HMD) 1600, in accordance with an embodiment of the disclosure. The HMD 1600 is an example of the HMD 102. The HMD 1600 includes a display device 1601 and a head band 1603. As shown, the HMD 1600 includes a plurality of lights 1600A, 1600B, 1600C, 1600D, 1600E, 1600F, 1600G, and 1600H. Each of these lights 1600A-H have specific shapes, and have the same or different colors. The lights 1600A, 1600B, 1600C, and 1600D are arranged on a front surface of the HMD 1600, such as on the display device 1601 of the HMD 1600. The lights 1600E and 1600F are arranged on a side surface of the HMD 1600. And the lights 1600G and 1600H are arranged at corners of the HMD 1600 to span the front surface and a side surface of the HMD 1600. It will be appreciated that the lights are identified in captured images of the real-world environment in which the user 100 uses the HMD 1600. Based on identification and tracking of the lights, the location and orientation of the HMD 1600 in the real-world environment is determined. It will further be appreciated that some of the lights are or are not visible depending upon a particular orientation of the HMD 1600 relative to the camera 108. Also, different portions of lights (e.g. lights 1600G and 1600H) are exposed for image capture depending upon an orientation of the HMD 1600 relative to the camera 108.

In one embodiment, the lights indicate a current status of the HMD 1600 to other users in the real-world environment. For example, some or all of the lights 1600A-H have a certain color arrangement, intensity arrangement, blink, have a certain on/off configuration, or have another arrangement indicating a current status of the HMD 1600. By way of example, the lights 1600A-H display different configurations during active game play of the video game versus other non-active game play aspects of the video game, such as navigating menu interfaces or configuring game settings, during which a scene is inactive or paused. The lights 1600A-H indicate relative intensity levels of game play. For example, an intensity of the lights 1600A-H or a rate of blinking of the lights 1600A-H increase when the intensity of the game play increases. In this manner, a person standing near the user 100 views one or more of the lights 1600A-H on the HMD 1600 and understands that the user 100 is actively engaged in intense game play, and may not wish to be disturbed at that moment.

The HMD 1600 additionally includes one or more microphones. In the illustrated embodiment, the HMD 1600 includes microphones 1604A and 1604B defined on the front surface of the HMD 1600, and microphone 1604C defined on a side surface of the HMD 1600. By utilizing an array of microphones, sound from each of the microphones is processed by the processor 114 of the computer 106 or the cloud gaming provider 112 to determine a location of the sound's source. The location of the sound's source is utilized in various ways, including exclusion of unwanted sound sources, association of a sound source with a visual identification, etc.

The HMD 1600 includes one or more image capture devices. In the illustrated embodiment, the HMD 1600 is shown to include image capture devices 1602A and 1602B. By utilizing a stereoscopic pair of image capture devices, three-dimensional (3D) images and video of the real-world environment are captured from a perspective of the HMD 1600. Such video is presented to the user 100 to provide the user with a "video see-through" ability while wearing the HMD 1600. That is, though the user 100 cannot see through the HMD 1600 in a strict sense, the video captured by the image capture devices 1602A and 1602B (e.g., or one or more front facing cameras 108' disposed on the outside body of the HMD 1600) nonetheless provide a functional equivalent of being able to see the real-world environment external to the HMD 1600 as if looking through the HMD 1600. Such video is augmented with virtual items to provide an augmented reality experience, or is combined or blended with the virtual items in other ways. Though in the illustrated embodiment, two cameras are shown on the front surface of the HMD 1600, it will be appreciated that there may be any number of externally facing cameras installed on the HMD 1600, oriented in any direction. For example, in another embodiment, there are cameras mounted on the sides of the HMD 1600 to provide additional panoramic image capture of the environment.

Figure 17:
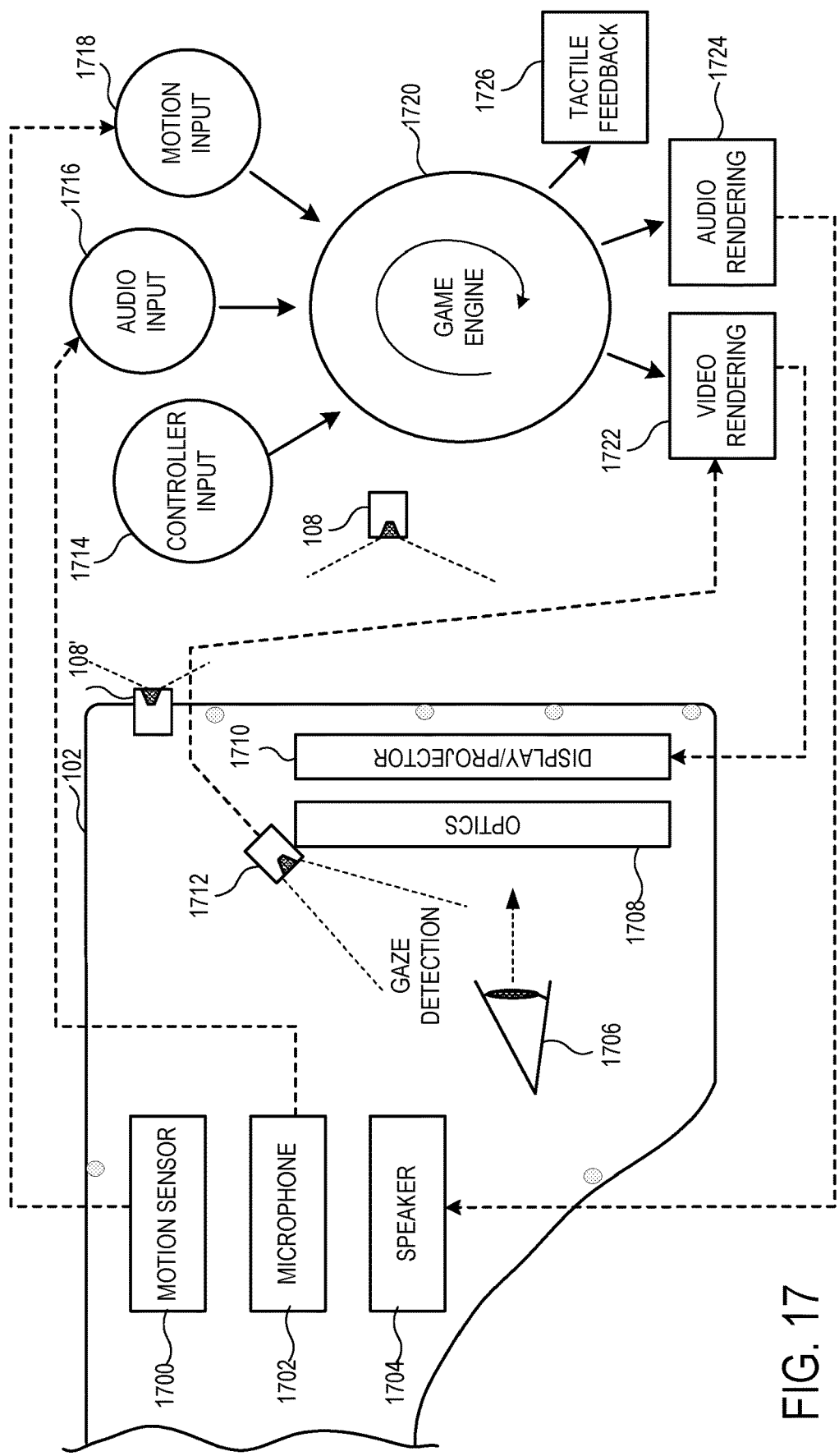
FIG. 17 illustrates a functionality of an HMD in conjunction with a video game, in accordance with an embodiment of the disclosure.

FIG. 17 illustrates a functionality of the HMD 102 in conjunction with the video game, in accordance with an embodiment of the disclosure. The video game is defined by a game engine 1720 which includes the game code and receives inputs to update a game state of the video game. The game state of the video game is defined, at least in part, by inputs received from gestures or voice commands of the user 100 or from selections of buttons on the tracked object 104 by the user 100. The inputs are captured by the camera 108, the HMD 102, and/or by inertial sensors, such as accelerometers, magnetometers, and gyroscopes. The inertial sensors are integrated within the HMD 102 or within hand-held controllers, such as the tracked object 104. Examples of the game state include various aspects of a current game play, such as a presence and location and orientation of virtual objects, conditions of a scene, triggering of events, user profiles, and view perspectives, etc.

The game engine 1720 receives, by way of example, a controller input 1714, an audio input 1716 and a motion input 1718. The controller input 1714 is defined from the operation of a gaming controller separate from the HMD 102, such as a handheld controller (e.g. Sony DUALSHOCK®4 wireless controller, Sony PlayStation®

Move motion controller, or a Sony Aim™ controller). By way of example, the controller input 1714 includes directional inputs, button presses, trigger activation, movements, gestures, or other kinds of inputs processed from the operation of the gaming controller. The audio input 1716 is received by the game engine 1720 from a sound of the user 100 that is captured by a microphone 1702 of the HMD 102, or from a microphone included in the image capture device 108, or elsewhere in the real-world environment. Each of the microphones 1604A through 1604C is an example of the microphone 1702. The motion input 1718 is received by the game engine 1720 from a motion sensor 1700 included in the HMD 102 and/or from the camera 108 as it captures images of the HMD 102. The game engine 1720 receives the inputs, e.g., the controller input 1714, the audio input 1716 and the motion input 1718, etc., and processes the inputs according to a configuration of the game engine 1720 to update the game state of the video game. The game engine 1720 outputs game state data to various rendering modules which process the game state data to define content which will be presented via the display device 122 to the user 100 or to another user via another HMD. Examples of the content include video content and audio content.

In the illustrated embodiment, a video rendering module 1722 is defined to render a video stream for presentation on the HMD 102 based on the game state data. The video stream is presented by a display/projector mechanism 1710, and viewed through optics 1708, such as one or more lenses, by an eye 1706 of the user 100. An audio rendering module 1704 renders an audio stream for listening by the user 100. In one embodiment, the audio stream is output through a speaker 1704 associated with the HMD 102. It should be appreciated that speaker 1704 takes the form of an open air speaker, headphones, or any other kind of speaker capable of presenting audio.

In an embodiment, the sound that is captured as the audio input 1716 is stored in a memory device of the computer 106 or of the cloud gaming service 112 in the form of audio data. As used herein, a memory device is a ROM, or a RAM, or a combination thereof. The audio data is accessed from the computer 106 or of the cloud gaming service 112 to be output as the audio stream on an HMD, which is other than the HMD 102.

In one embodiment, a gaze tracking camera 1712 is included in the HMD 102 to enable tracking of a gaze of the user 100. The gaze is an example of a gesture performed by the user 100. The gaze tracking camera captures images of eyes of the user 100. The images are analyzed to determine a gaze direction of the user 100. In one embodiment, information about the gaze direction of the user 100 is utilized to affect the video rendering. For example, if the eyes of the user 100 are determined to be looking in a specific direction, then the video rendering for that direction is prioritized or emphasized, such as by providing greater detail or faster updates in the region where the user 100 is looking. It should be appreciated that the gaze direction of the user 100 is defined relative to the HMD 102, relative to the real-world environment in which the user 100 is situated, and/or relative to the virtual environment that is being rendered on the HMD 102.

Additionally, a tactile feedback module 1726 provides signals to tactile feedback hardware included in either the HMD 102 or another device operated by the user 100, such as the tracked object 104 or another hand-held controller. The tactile feedback module 1726 takes the form of various kinds of tactile sensations, such as vibration feedback, temperature feedback, pressure feedback, etc.

At present, streaming services for sharing game replays are very popular. The DualShock®4 wireless controller includes a "share button" directly on the controller to enable such sharing. Implementations of the present disclosure improve sharing replays for people who wish to explore replays using an HMD. Implementations of the present disclosure provide for rendering of a game replay with a very wide field of view to allow a spectator to move his head freely using the HMD 102 and view the replay from novel vantage points. The traditional streaming approach would limit the replay to only what the original player viewed, so that the view direction would be independent of the spectator's head position and orientation, and if the spectator using the HMD 102 moved his head, nothing would change.

Implementations of the disclosure provide for the rendering of videos in a wide enough field of view to support novel viewpoints in the HMD 102. A custom build of a game engine that runs on the gaming cloud service 112 (e.g. on console gaming hardware, e.g. PlayStation® 4 hardware, in the cloud), that accepts as input game state streamed from the original player's game engine and uses it to render an extremely wide field of view (e.g. 150 degree plus) view of the video game, that is then used for real-time streaming and/or pre-recorded playback of that game session. It will be appreciated that the extremely wide field of view is in excess of the HMD 102's field of view, allowing for the spectator wearing the HMD 102 to look around in the replay. The video game is configured to stream its state to the networked version of the engine.

As described above, there is a need to provide users the ability to spectate, e.g., watch the interactive activity being experienced by users wearing HMDs 102. For example, an HMD player, such as the user 100, is immersed in the activity presented in the HMD 102, while other persons are co-located with the HMD player. These other co-located players find enjoyment in watching the interactivity experienced or virtual reality scene being viewed by the user 100 via the HMD 102. As used herein, the HMD player is one that is viewing content presented on the HMD 102, or is one that is interacting with some content presented on the HMD 102, or is playing a game presented on the HMD 102. As such, reference to an HMD player, is made with reference to a user that is wearing the HMD 102, irrespective of the type of content being presented on the HMD 102.

In still other embodiments, other persons that are not co-located with the HMD player wish to view the content, interactivity, or media being presented in the HMD 102 worn by the HMD player. For instance, a website is provided to present users with the ability to select from different HMD players, so as to watch and spectate while the HMD player performs his or her activities. This example is similar to standard Twitch-type experiences, which allow users connected to the computer network 110 to access a website and search for different types of content or media being played by remote players. The remote players, in some embodiments, are playing games using an HMD, such as the HMD 102.

In other embodiments, the remote players are playing games or watching content using a display screen of a device or a television display screen. Broadly speaking, users wishing to watch the activity of the HMD player that is remote, e.g., over a website, select specific players or types of games, or thumbnails of the games, or thumbnails of the content, to view the activity being directed by the HMD player. Thus, a website is provided that enables users to view and select specific interactive content that may be actively played by the HMD player. The remote viewer wishing to view the activity by the HMD player, simply clicks on that content and begins watching.

The person watching and viewing the actions by the HMD player is generally referred to as a spectator. Spectators are those persons who are given access to view the activities, interactivities, actions, movements, etc., but are not necessarily controlling the game action. For this reason, these viewers are referred to as spectators. In the context of the HMD player, the content being presented on the display of the HMD 102 is dynamic and is controlled by the movements of the HMD player. For example, when the HMD player moves his or her head around, the HMD player is presented with different content that is viewable, similar to the way real world viewing of a person's surroundings can occur.

In one embodiment, each of the game engine 1720, the video rendering module 1722 and the audio rendering module 1724 is hardware, such as an integrated circuit, or a computer software program, that is executed by one or more processors. In an embodiment, each of the game engine 1720, the video rendering module 1722 and the audio rendering module 1724 is executed by one or more processors of the cloud gaming service 112 or of the computer 106. As used herein, a processor is an ASIC, or a PLD, or a CPU, or a controller.

Figure 18:
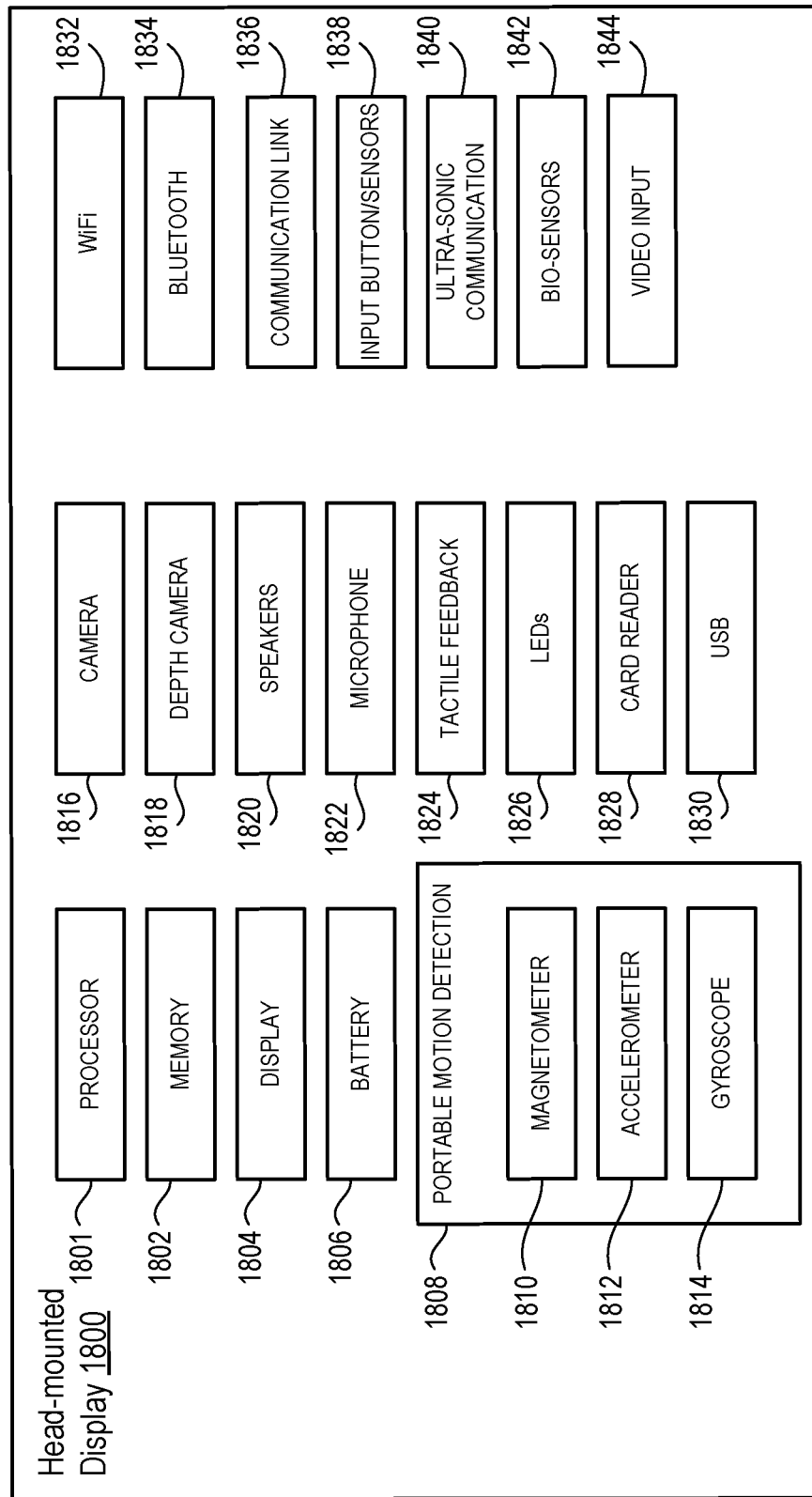
FIG. 18 is a diagram illustrating components of an HMD, in accordance with an embodiment of the disclosure.

With reference to FIG. 18, a diagram illustrating components of an HMD 1800 is shown, in accordance with an embodiment of the disclosure. The HMD 1800 is an example of the HMD 102. The HMD 1800 includes a processor 1801 for executing program instructions. A memory device 1802 is provided for storage purposes, and may include both volatile and non-volatile memory. A display device 1804 is included which provides a visual interface that a user may view. A battery 1806 is provided as a power source for the HMD 1800. A motion detection module 1808 includes any of various kinds of motion sensitive hardware, such as a magnetometer 1810, an accelerometer 1812, and a gyroscope 1814.

An accelerometer is an inertial sensor for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1812 are used to provide the direction of gravity, which gives an absolute reference for two angles (world-space pitch and world-space roll).

A magnetometer is an inertial sensor that measures the strength and direction of the magnetic field in the vicinity of the HMD 1800. In one embodiment, three magnetometers 1810 are used within the HMD 1800, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope or the camera. In one embodiment, the accelerometer 1812 is used together with magnetometer 1810 to obtain the inclination and azimuth of the HMD 1800. In some implementations, the magnetometers of the HMD 1800 are read during times when electromagnets in other nearby devices are inactive.

A gyroscope is an inertial sensor for measuring or maintaining orientation, based on the principles of angular momentum. In one embodiment, three gyroscopes 1814 provide information about movement across the respective axis, such as an x-axis, a y-axis, and a z-axis, of the real-world environment based on inertial sensing. The gyroscopes help in detecting fast rotations. However, the gyroscopes can drift overtime without the existence of an absolute reference. The gyroscopes are reset periodically, and the resetting done using other available information, such as positional/orientation determination based on visual tracking of an object, accelerometer, magnetometer, etc.

A camera 1816 is provided for capturing images and image streams of the real-world environment. More than one camera is included in the HMD 1800, including a camera that is external (directed away from a user when the user is viewing the display of the HMD 1800), and a camera that is internal (directed towards the user when the user 100 is viewing the display of the HMD 1800). Additionally, in some embodiments, a depth camera 1818 is included in the HMD 1800 for sensing depth information of objects in a real environment.

The HMD 1800 includes speakers 1820 for providing audio output. Also, in some embodiments, a microphone 1822 is included for capturing audio from the real environment, including sounds from the ambient environment, speech made by the user 100, etc. The HMD 1800 includes tactile feedback module 1824 for providing tactile feedback to the user 100. In one embodiment, the tactile feedback module 1824 is capable of causing movement and/or vibration of the HMD 1800 so as to provide tactile feedback to the user 100.

LEDs 1826 are provided as visual indicators of statuses of the HMD 1800. For example, an LED may indicate battery level, power on, etc. A card reader 1828 is provided to enable the HMD 1800 to read and write information to and from a memory card. A USB interface 1830 is included as one example of an interface for enabling connection of peripheral devices, or connection to other devices, such as other portable devices, computers, etc. In various embodiments of the HMD 1800, any of various kinds of interfaces may be included to enable greater connectivity of the HMD 1800.

A Wi-Fi module 1832 is included for enabling connection to the Internet or a local area network via wireless networking technologies. Also, the HMD 1800 includes a Bluetooth module 1834 for enabling wireless connection to other devices. In some embodiments, a communications link 1836 is included for connection to other devices. In one embodiment, the communications link 1836 utilizes infrared transmission for wireless communication. In other embodiments, the communications link 1836 utilizes any of various wireless or wired transmission protocols for communication with other devices.

Input buttons/sensors 1838 are included to provide an input interface for the user 100. Any of various kinds of input interfaces are included, such as buttons, touchpad, joystick, trackball, etc. An ultra-sonic communication module 1840 may be included in HMD 1800 for facilitating communication with other devices via ultra-sonic technologies.

Bio-sensors 1842 are included to enable detection of physiological data from the user 100. In one embodiment, the bio-sensors 1842 include one or more dry electrodes for detecting bio-electric signals of the user 100 through the user 100's skin.

A video input 1844 receives a video signal from a primary processing computer (e.g. main game console) for rendering on the HMD 1800. In some implementations, the video input is a high-definition multimedia input (HDMI) input.

The foregoing components of HMD 1800 have been described as merely exemplary components that are included in HMD 1800. In various embodiments of the disclosure, the HMD 1800 includes or does not include some of the various aforementioned components. Embodiments of the HMD 1800 additionally includes other components not presently described, but known in the art, for purposes of facilitating aspects of the present disclosure as herein described.

Figure 19:
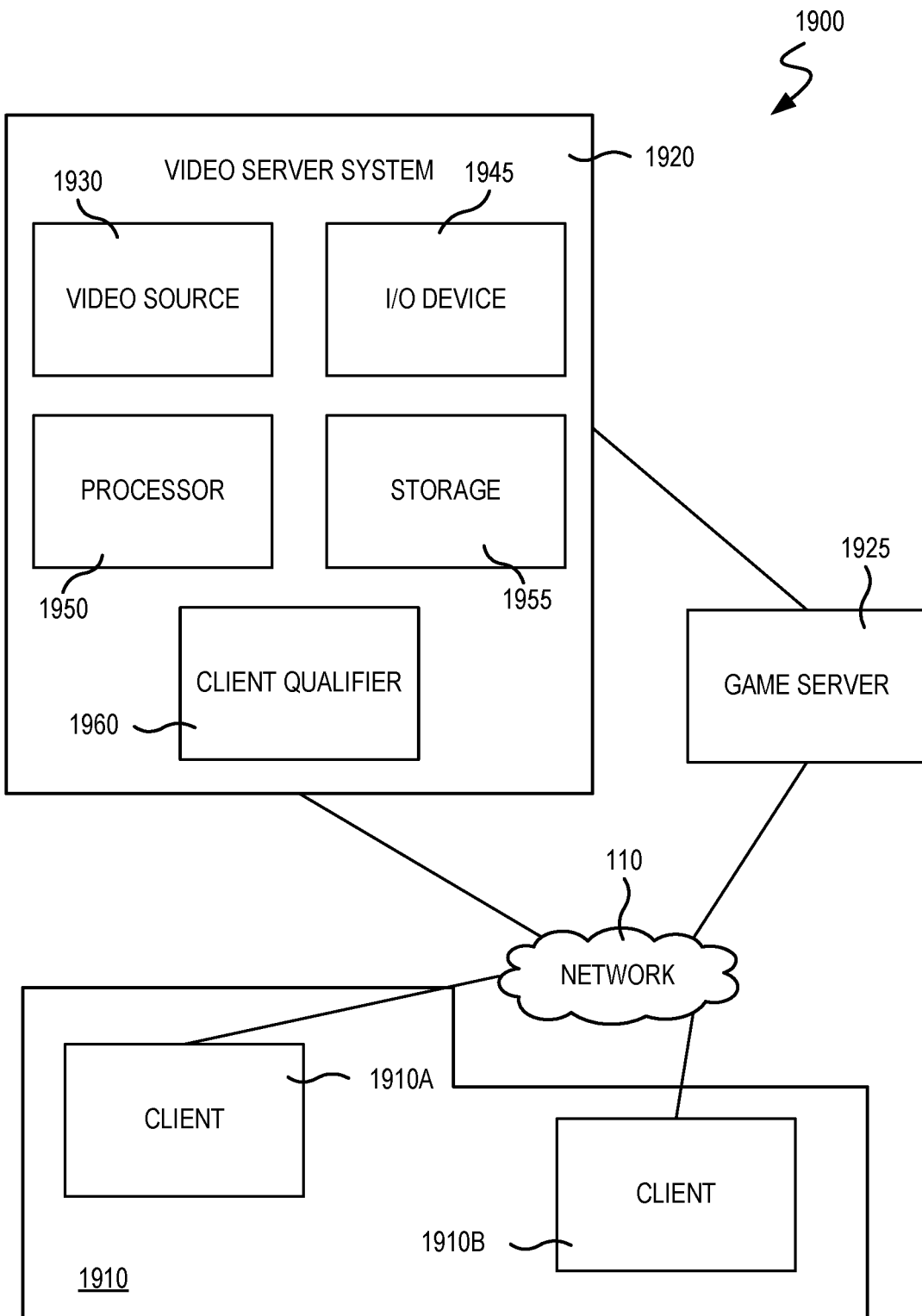
FIG. 19 is a block diagram of a game system, according to an embodiment of the disclosure.

FIG. 19 is a block diagram of a game system 1900, according to various embodiments of the disclosure. The game system 1900 provides a video stream to one or more clients 1910 via the computer network 110. The game system 1900 typically includes a video server system 1920 and an optional game server 1925. In one embodiment, the game server 1925 is located within the video server system 1920. The video server system 1920 includes a video encoder that provides a video stream having encoded video frames to the one or more clients 1910, e.g., HMDs described herein, the computer 106 (FIG. 1), etc., having a minimal quality of service. For example, the video server system 1920 receives a game command that changes the state of or a point of view within a video game, and provides the clients 1910 with an updated video stream reflecting this change in state with minimal lag time. The video encoder of the video server system 1920 provides the video stream in a wide variety of alternative video formats, including formats yet to be defined. Further, as an example, the video stream includes encoded the video frames for presentation to a user at a wide variety of frame rates. Typical frame rates are 30 frames per second, 60 frames per second, and 120 frames per second. Although higher or lower frame rates are included in alternative embodiments of the disclosure.

The clients 1910, referred to herein individually as 1910A, 1910B, etc., include head mounted displays, terminals, personal computers, game consoles, tablet computers, telephones, set top boxes, kiosks, wireless devices, digital pads, stand-alone devices, handheld game playing devices, and/or the like. Typically, the clients 1910 receive video streams having encoded video frames, include a decoder for decoding the video frames, and present the resulting video to a user, e.g., a player of a game. The processes of receiving encoded video frames and/or decoding the video frames typically includes storing individual video frames in a receive buffer of the client 1910A or 1910B. The decoded video frames are presented to a user on a display integral to the client 1910A or 1910B or on a separate device such as a monitor or television. The clients 1910 optionally support more than one game player. For example, a game console supports two, three, four or more simultaneous players. Each of these players receive a separate video stream, or a single video stream includes regions of a frame generated specifically for each player, e.g., generated based on each player's point of view. The clients 1910 are optionally geographically dispersed. The number of clients 1910 included in the game system 1900 varies widely from one or two to thousands, tens of thousands, or more. As used herein, the term "game player" is used to refer to a person that plays a game and the term "game playing device" is used to refer to a device used to play a game. In some embodiments, the game playing device refers to a plurality of computing devices that cooperate to deliver a game experience to the user. For example, a game console and an HMD cooperate with the video server system 1920 to deliver a game viewed through the HMD. In one embodiment, the game console receives the video stream from the video server system 1920, and the game console forwards the video stream, or updates to the video stream, to the HMD for rendering.

The clients 1910 receive video streams via the computer network 110. The computer network 110 is any type of communication network including the Internet, wireless networks, local area networks, wide area networks, private networks, and/or the like. In typical embodiments, the video streams are communicated via communication protocols, such as TCP/IP or User Datagram Protocol over IP (UDP/IP). Alternatively, the video streams are communicated via proprietary standards.

An example of each client 1910 is a personal computer including a processor, non-volatile memory, a display, decoding logic, network communication capabilities, and input devices. The decoding logic includes hardware, firmware, and/or software stored on a computer readable medium. Systems for decoding (and encoding) video streams vary depending on the particular encoding scheme used.

In some embodiments, the clients 1910 further include systems for modifying received video. For example, a client performs further rendering, to overlay one video image on another video image, to crop a video image, and/or the like. For example, clients 1910 receive various types of video frames, such as I-frames, P-frames and B-frames, and to process these frames into images for display to a user. In some embodiments, clients 1910 perform further rendering, shading, conversion to three-dimensional (3-D) images, or like operations on the video stream. The clients 1910 optionally receive more than one audio or video stream. Input devices of the clients 1910 include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by the clients 1910 is generated and provided by the video server system 1920. This video stream includes video frames (and the audio stream includes audio frames). The video frames contribute (e.g., they include pixel information in an appropriate data structure) meaningfully to the images displayed to the user. As used herein, the term "video frames" is used to refer to frames including predominantly information that contributes to, e.g. to effect, the images shown to the user. Most of the teachings herein with regard to "video frames" are also applied to "audio frames", in some embodiments.

The clients 1910 receive inputs from the user 100 via one or more of the input devices. These inputs include game commands that change the state of the video game or otherwise affect game play. The game commands are received using the input devices and/or are automatically generated by computing instructions executing on clients 1910. The received game commands are communicated from the clients 1910 via the computer network 110 to the video server system 1920 and/or the game server 1925. For example, in some embodiments, the game commands are communicated to the game server 1925 via the video server system 1920. In some embodiments, separate copies of the game commands are communicated from the clients 1910 to the game server 1925 and the video server system 1920. The communication of game commands is optionally dependent on the identity of the command. Game commands are optionally communicated from the client 1910A through a different route or communication channel that that used to provide audio or video streams to the client 1910A.

The game server 1925 is optionally operated by a different entity than the video server system 1920. For example, the game server 1925 is operated by a publisher of a multiplayer game. In this example, the video server system 1920 is optionally viewed as a client by the game server 1925 and optionally configured to appear from the point of view of the game server 1925 to be a client executing a game engine. Communication between the video server system 1920 and the game server 1925 optionally occurs via the computer network 110. As such, the game server 1925 is a multiplayer game server that sends game state information to multiple clients, one of which is the video server system 1920. The video server system 1920 communicates with multiple instances of the game server 1925 at the same time. For example, the video server system 1920 provides a plurality of different video games to different users. Each of these different video games are supported by a different game server and/or published by different entities. In some embodiments, several geographically distributed instances of the video server system 1920 provide game video to a plurality of different users. Each of these instances of the video server system 1920 is in communication with the same instance of the game server 1925. Communication between the video server system 1920 and one or more game servers optionally occurs via a dedicated communication channel. For example, the video server system 1920 is connected to the game server 1925 via a high bandwidth channel that is dedicated to communication between these two systems.

The video server system 1920 includes at least a video source 1930, an input/output (I/O) device 1945, a processor 1950, and non-transitory storage 1955. The video server system 1920 includes one computing device or be distributed among a plurality of computing devices. These computing devices are optionally connected via a communications system such as a local area network.

The video source 1930 provides a video stream, e.g., streaming video or a series of video frames that form a moving picture. In some embodiments, the video source 1930 includes a video game engine and rendering logic. The video game engine receives game commands from a player and to maintain a copy of the state of the video game based on the received commands. This game state includes the position of objects in a game environment, as well as typically a point of view. The game state includes, in some embodiments, properties, images, colors and/or textures of objects. The game state is typically maintained based on game rules, as well as game commands such as move, turn, attack, set focus to, interact, use, and/or the like. Part of the game engine is optionally disposed within the game server 1925. The game server 1925 maintains, in various embodiments, a copy of the state of the game based on game commands received from multiple players using geographically disperse clients. In these cases, the game state is provided by the game server 1925 to the video source 1930, where a copy of the game state is stored and rendering is performed. The game server 1925 receives game commands directly from the clients 1910 via the computer network 110.

The video source 1930 includes rendering logic, e.g., hardware, firmware, and/or software stored on a computer readable medium such as a storage 1955. This rendering logic creates video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to the clients 1910. For example, the raw video is encoded according to an Adobe Flash® standard, .wav, H.264, H.263, On2, VP6, VC-1, WMA, Huffyuv, Lagarith, MPG-x. Xvid, FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream includes, in some embodiments, different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In an embodiment, the video source 1930 includes a video recording device such as a camera. This camera is used to generate delayed or live video that can be included in the video stream of a computer game. The resulting video stream, optionally includes both rendered images and images recorded using a still or video camera. The video source 1930 also includes, in some embodiments, storage devices configured to store previously recorded video to be included in a video stream. The video source 1930 includes, in various embodiments, motion or positioning sensing devices configured to detect motion or position of an object, e.g., person, and logic configured to determine a game state or produce video-based on the detected motion and/or position.

The video source 1930 optionally provides overlays to be placed on other video. For example, these overlays include a command interface, log in instructions, messages to a game player, images of other game players, video feeds of other game players (e.g., webcam video). In embodiments of client 1910A including a touch screen interface or a gaze detection interface, the overlay may include a virtual keyboard, joystick, touch pad, and/or the like. In one example of an overlay a player's voice is overlaid on an audio stream. The video source 1930 optionally further includes one or more audio sources.

In embodiments in which the video server system 1920 maintains the game state based on input from more than one player, each player has a different point of view including a position and direction of view. The video source 1930 optionally provides a separate video stream for each player based on their point of view. Further, the video source 1930 optionally provides a different frame size, frame data size, and/or encoding to each of the clients 1910. The video source 1930 optionally provides 3-D video.

I/O Device 1945 for the video server system 1920 sends and/or receives information such as video, commands, requests for information, a game state, gaze information, device motion, device location, user motion, client identities, player identities, game commands, security information, audio, and/or the like. I/O Device 1945 includes communication hardware such as a network card or modem. I/O Device 1945 communicates with the game server 1925, the computer network 110, and/or the clients 1910.

The processor 1950 executes logic, e.g. software, included within the various components of the video server system 1920 discussed herein. For example, processor 1950 is programmed with software instructions in order to perform the functions of the video source 1930, game server 1925, and/or a client qualifier 1960. The video server system 1920 optionally includes more than one instance of the processor 1950. The processor 1950 is also programmed with software instructions in order to execute commands received by the video server system 1920, or to coordinate the operation of the various elements of the game system 1900 discussed herein. The processor 1950 includes one or more hardware devices. The processor 1950 is an electronic processor.

Storage 1955 includes non-transitory analog and/or digital storage devices. For example, storage 1955 includes an analog storage device configured to store video frames. Storage 1955 may include a computer readable digital storage, e.g. a hard drive, an optical drive, or solid state storage. Storage 1915 stores (e.g. by way of an appropriate data structure or file system) video frames, artificial frames, a video stream including both video frames and artificial frames, audio frame, an audio stream, and/or the like. Storage 1955 is optionally distributed among a plurality of devices. In some embodiments, storage 1955 stores the software components of the video source 1930 discussed elsewhere herein. These components are stored in a format ready to be provisioned when needed.

The video server system 1920 optionally further includes a client qualifier 1960. Client qualifier 1960 remotely determines the capabilities of a client, such as client 1910A or 1910B. These capabilities include both the capabilities of the client 1910A itself as well as the capabilities of one or more communication channels between the client 1910A and the video server system 1920. For example, the client qualifier 1960 tests a communication channel through the computer network 110.

The client qualifier 1960 determines (e.g., discover) the capabilities of the client 1910A manually or automatically. Manual determination includes communicating with a user of the client 1910A and asking the user to provide capabilities. For example, in some embodiments, the client qualifier 1960 displays images, text, and/or the like within a browser of the client 1910A. In one embodiment, the client 1910A is an HMD that includes a browser. In another embodiment, client 1910A is a game console having a browser, which may be displayed on the HMD. The displayed objects request that the user enter information such as operating system, processor, video decoder type, type of network connection, display resolution, etc. of the client 1910A. The information entered by the user is communicated back to the client qualifier 1960.

Automatic determination occurs, for example, by execution of an agent on the client 1910A and/or by sending test video to the client 1910A. The agent includes computing instructions, such as java script, embedded in a web page or installed as an add-on. The agent is optionally provided by the client qualifier 1960. In various embodiments, the agent finds out processing power of the client 1910A, decoding and display capabilities of the client 1910A, lag time reliability and bandwidth of communication channels between the client 1910A and the video server system 1920, a display type of the client 1910A, firewalls present on the client 1910A, hardware of the client 1910A, software executing on the client 1910A, registry entries within the client 1910A, and/or the like.

The client qualifier 1960 includes hardware, firmware, and/or software stored on a computer readable medium. The client qualifier 1960 is optionally disposed on a computing device separate from one or more other elements of the video server system 1920. For example, in some embodiments, the client qualifier 1960 determines the characteristics of communication channels between the clients 1910 and more than one instance of the video server system 1920. In these embodiments the information discovered by Client Qualifier is used to determine which instance of the video server system 1920 is best suited for delivery of streaming video to one of the clients 1910.

In some embodiments, a classifier of real world objects is used to detect and identify objects from the above mentioned cameras. These classifiers, allow for the fast identification of real world objects by containing or being connected via internet to a database of computer recognizable objects. For example, the classifier is able to identify individual objects such as a coffee table or lamp situated within the virtual reality interactive space. As a further example, the classifier is able to identify a floor and a wall and the points at which the two meet.

In various embodiments, an HMD includes cameras on a front face of the HMD and on a band that is worn on a back side of a user's head. The cameras on the back side face an real-world environment in which the user performs a gesture to protect the user from accidentally hitting an object behind the user.

Embodiments described in the present disclosure may be practiced with various computer system configurations including hand-held devices, microprocessor systems, microprocessor-based or programmable consumer electronics, minicomputers, mainframe computers and the like. The embodiments described in the present disclosure can also be practiced in distributed computing environments where tasks are performed by remote processing devices that are linked through a wire-based or wireless network.

With the above embodiments in mind, it should be understood that the embodiments described in the present disclosure can employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Some embodiments described in the present disclosure can also be embodied as computer readable code on a computer readable medium. The computer readable medium is any data storage device that can store data, which can be thereafter be read by a computer system. Examples of the computer readable medium include a hard drive, a network attached storage (NAS), a ROM, a RAM, a compact disc-ROM (CD-ROM), a CD-recordable (CD-R), a CD-rewritable (RW), a magnetic tape, an optical data storage device, a non-optical data storage device, etc. The computer readable medium can include computer readable tangible medium distributed over a network-coupled computer system so that the computer readable code is stored and executed in a distributed fashion.

It should be noted that in some embodiments, any feature of some of the embodiments described herein are combined with a feature of the remaining embodiments.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Additionally, though embodiments in the present disclosure are described with reference to a head-mounted display, it will be appreciated that in other embodiments, non-head mounted displays are used instead, including without limitation, a television, projector, liquid crystal display (LCD) display screen, portable device screen (e.g. tablet, smartphone, laptop, etc.) or any other type of display that render video and/or provide for display of the virtual environment in accordance with the present embodiments.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A system comprising:
a head-mounted display (HMD) situated within a real-world environment, wherein the HMD includes a camera that is configured to identify a field-of-view encompassing a plurality of boundaries,
wherein the camera is configured to capture one or more images;
a processor coupled to the camera to receive the one or more images from the camera, wherein the processor is configured to identify a position of the HMD in the real-world environment from the one or more images,
wherein the processor is configured to determine whether the HMD has crossed one of the plurality of boundaries based on the identified position of the HMD,
wherein the processor is configured to generate image data for a virtual boundary defined by one or more lines that outline a plurality of surfaces upon determining that the HMD has crossed the one of the plurality of boundaries, wherein the plurality of surfaces of the virtual boundary include a first surface and a second surface, wherein the second surface is angled with respect to the first surface, and
wherein the processor is configured to send the image data to the HMD for display of the virtual boundary on the HMD.

2. The system of claim 1, wherein the plurality of boundaries form a trackable volume, wherein the camera is configured to track movement of the HMD within the trackable volume.

3. The system of claim 1, wherein the HMD includes a light source, wherein to determine that the HMD has crossed the one of the plurality of boundaries, the processor is configured to determine that the light source of the HMD has crossed the one of the plurality of boundaries.

4. The system of claim 1, wherein the HMD includes a display device, wherein to determine that the HMD has crossed the one of the plurality of boundaries, the processor is configured to determine that the display device of the HMD has crossed the one of the plurality of boundaries.

5. The system of claim 1, wherein the virtual boundary is a virtual guard rail.

6. The system of claim 5, wherein the one or more lines includes a series of horizontal lines and a series of vertical lines, wherein the virtual guard rail is a virtual grid that includes the series of horizontal lines and the series of vertical lines, wherein the series of horizontal lines intersects the series of vertical lines.

7. The system of claim 1, wherein the processor is configured to move the virtual boundary with movement of the HMD.

8. The system of claim 1, wherein the second surface has a depth with respect to the first surface.

9. The system of claim 1, wherein the plurality of surfaces include a third surface, wherein the third surface is angled with respect to the first surface.

10. The system of claim 9, wherein the second and third surfaces have depth with respect to the first surface.

11. The system of claim 1, further comprising:
a hand-held controller,
wherein the processor is configured to determine whether the hand-held controller is outside the one of the plurality of boundaries,
wherein the processor is configured to display an image of a virtual object representing the hand-held controller in a virtual scene having the virtual boundary,
wherein the processor is configured to display an image overlaid on top of the image of the virtual object upon determining that the hand-held controller is outside the one of the plurality of boundaries.

12. A system comprising:
a head-mounted display (HMD) situated within a real-world environment, wherein the HMD includes a camera that is configured to identify a field-of-view encompassing a plurality of boundaries,
wherein the plurality of boundaries include a first boundary, a second boundary, a third boundary, and a fourth boundary, wherein the first boundary is connected to the second boundary, the second boundary is connected to the third boundary, the third boundary is connected to the fourth boundary, and the fourth boundary is connected to the first boundary, wherein the first boundary is closer to the camera than the third boundary, and the second and fourth boundaries are located on opposite sides of and in front of the camera,
wherein the camera is configured to capture one or more images;
a processor coupled to the camera to receive the one or more images from the camera, wherein the processor is configured to identify a position of the HMD in the real-world environment from the one or more images,
wherein the processor is configured to determine whether the HMD has crossed one of the plurality of boundaries based on the identified position of the HMD,
wherein the processor is configured to generate image data for a virtual boundary defined by one or more lines upon determining that the HMD has crossed the one of the plurality of boundaries, and wherein the processor is configured to send the image data to the HMD for display of the virtual boundary on the HMD.

13. A method comprising:

receiving one or more images;

identifying a position of a head-mounted display (HMD) in a real-world environment from the one or more images;

determining based on the identified position of the HMD whether the HMD has crossed one of a plurality of boundaries in the real-world environment;

generating image data for a virtual boundary defined by one or more lines that outline a plurality of surfaces upon determining that the HMD has crossed the one of the plurality of boundaries, wherein the plurality of surfaces of the virtual boundary include a first surface and a second surface, wherein the second surface is angled with respect to the first surface; and sending the image data to the HMD for display of the virtual boundary on the HMD.

14. The method of claim 13, wherein the one or more images are received from a camera, wherein the plurality of boundaries include a first boundary, a second boundary, a third boundary, and a fourth boundary, wherein the first boundary is connected to the second boundary, the second boundary is connected to the third boundary, the third boundary is connected to the fourth boundary, and the fourth boundary is connected to the first boundary, wherein the first boundary is closer to the camera than the third boundary, and the second and fourth boundaries are located on opposite sides of and in front of the camera.

15. The method of claim 13, wherein the plurality of boundaries form a trackable volume for tracking by a camera.

16. The method of claim 13, wherein the HMD includes a light source, wherein said determining that the HMD has crossed the one of the plurality of boundaries includes determining that the light source of the HMD has crossed the one of the plurality of boundaries.

17. The method of claim 13, wherein the HMD includes a display device, wherein said determining that the HMD has crossed the one of the plurality of boundaries includes determining that the display device of the HMD has crossed the one of the plurality of boundaries.

18. The method of claim 13, wherein the virtual boundary is a virtual guard rail.

19. The method of claim 18, wherein the one or more lines includes a series of horizontal lines and a series of vertical lines, wherein the virtual guard rail is a virtual grid that includes the series of horizontal lines and the series of vertical lines, wherein the series of horizontal lines intersects the series of vertical lines.

20. A system comprising:

a camera configured to have a field-of-view encompassing a plurality of boundaries within a real-world environment, wherein the camera is configured to capture one or more images;

a processor coupled to the camera to receive the one or more images from the camera, wherein the processor is configured to identify a position of a head-mounted display (HMD) in the real-world environment from the one or more images, wherein the processor is configured to determine whether the HMD has crossed one of the plurality of boundaries based on the identified position of the HMD, wherein the processor is configured to generate image data for a virtual boundary defined by one or more lines that outline a plurality of surfaces upon determining that the HMD has crossed the one of the plurality of boundaries, wherein the plurality of surfaces of the virtual boundary include a first surface and a second surface, wherein the second surface is angled with respect to the first surface, and wherein the processor is configured to send the image data to the HMD for display of the virtual boundary on the HMD.

21. The system of claim 20, wherein the plurality of boundaries include a first boundary, a second boundary, a third boundary, and a fourth boundary, wherein the first boundary is connected to the second boundary, the second boundary is connected to the third boundary, the third boundary is connected to the fourth boundary, and the fourth boundary is connected to the first boundary, wherein the first boundary is closer to the camera than the third boundary, and the second and fourth boundaries are located on opposite sides of and in front of the camera.

22. The system of claim 20, wherein the plurality of boundaries form a trackable volume, wherein the camera is configured to track movement of the HMD within the trackable volume.

23. The system of claim 20, wherein the HMD includes a light source, wherein to determine that the HMD has crossed the one of the plurality of boundaries, the processor is configured to determine that the light source of the HMD has crossed the one of the plurality of boundaries.

24. The system of claim 20, wherein the virtual boundary is a virtual guard rail.

25. The system of claim 24, wherein the one or more lines includes a series of horizontal lines and a series of vertical lines, wherein the virtual guard rail is a virtual grid that includes the series of horizontal lines and the series of vertical lines, wherein the series of horizontal lines intersects the series of vertical lines.

* * * * *